(12) United States Patent
Lee et al.

(10) Patent No.: US 12,726,324 B2
(45) Date of Patent: Sep. 1, 2026

(54) MULTI-TTI MULTI-MCS SCHEDULING DCI TRANSMISSION METHOD AND DEVICE

(71) Applicant: LG ELECTRONICS INC., Seoul (KR)

(72) Inventors: Jongku Lee, Seoul (KR); Sunam Kim, Seoul (KR); Sungryong Hong, Seoul (KR); Byounggill Kim, Seoul (KR); Taehowan Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 273 days.

(21) Appl. No.: 18/696,688

(22) PCT Filed: Sep. 29, 2021

(86) PCT No.: PCT/KR2021/013383
§ 371 (c)(1),
(2) Date: Mar. 28, 2024

(87) PCT Pub. No.: WO2023/054750
PCT Pub. Date: Apr. 6, 2023

(65) Prior Publication Data

US 2024/0396699 A1 Nov. 28, 2024

(51) Int. Cl.
*H04L 5/00* (2006.01)
*H04W 72/231* (2023.01)

(52) U.S. Cl.
CPC ......... *H04L 5/0092* (2013.01); *H04W 72/231* (2023.01)

(58) Field of Classification Search
CPC ... H04L 1/0003; H04L 1/0016; H04L 1/0009; H04L 1/08; H04L 27/2601; H04W 72/231; H04W 72/1263
See application file for complete search history.

(56) References Cited

U.S. PATENT DOCUMENTS

2019/0394785 A1* 12/2019 He ........................ H04L 1/0023
2021/0273759 A1* 9/2021 Maki ..................... H04L 1/0003
2023/0089599 A1* 3/2023 Elshafie ................ H04L 1/0026
370/328

FOREIGN PATENT DOCUMENTS

WO 2020/143908 A1 1/2019
WO 2021/187823 A1 9/2021
WO WO-2021188893 A1 * 9/2021 .......... H04W 72/231

OTHER PUBLICATIONS

Intel Corporation, "Discussion on PDSCH/PUSCH enhancements for extending NR up to 71 GHz", 3GPP TSG RAN WG1 #105-e, R1-2104896, e-Meeting, May 19-27, 2021.

(Continued)

*Primary Examiner* — Mahran Y Abu Roumi
(74) *Attorney, Agent, or Firm* — BRYAN CAVE LEIGHTON PAISNER LLP

(57) ABSTRACT

A multi-transmission time interval (TTI) multi-modulation and coding scheme (MCS) scheduling downlink control information (DCI) transmission method and device is provided. A user equipment (UE) receives one piece of downlink control information for scheduling of both a first shared channel and a second shared channel. The downlink control information includes a reference modulation and coding scheme (MCS) index and a first offset value for the reference MCS index. The UE communicates with the network through the first shared channel to which a first MCS index is applied, and after communicating through the first shared channel, communicates with the network through the second shared channel to which a second MCS index greater than the first MCS index is applied. The first MCS index is based on the reference MCS index, and the second MCS index is based on the reference MCS index and the first offset value.

14 Claims, 19 Drawing Sheets

(56) References Cited

OTHER PUBLICATIONS

LG Electronics, "Discussion on multi-cell PDSCH scheduling via a single DCI", 3GPP TSG RAN WG #105-e, R1-2105442, e-Meeting, May 10-27, 2021.

* cited by examiner

FIG. 2

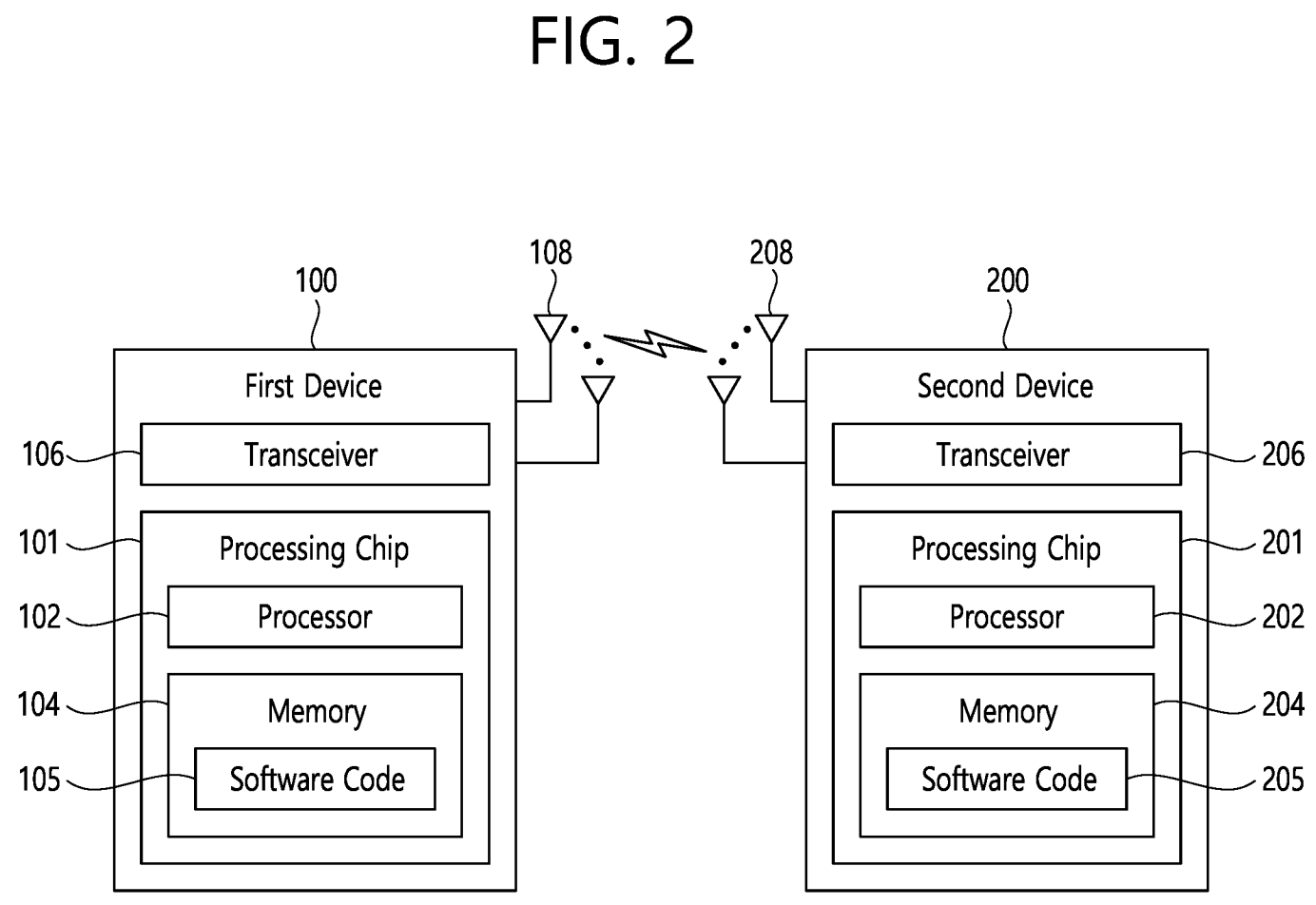

100
First Device
Transceiver
Processing Chip
Processor
Memory
Software Code
106
101
102
104
105
108

200
Second Device
Transceiver
Processing Chip
Processor
Memory
Software Code
206
201
202
204
205
208

HARQ PN
MCS index
K
$I_{REF}+O_1$
(K+1) modulo $N_{HARQ}$
$I_{REF}+O_2$
(K+2) modulo $N_{HARQ}$
$I_{REF}+O_3$
(K+3) modulo $N_{HARQ}$
$I_{REF}+O_4$
PXSCH #1-1
PXSCH #2-1
PXSCH #3-1
PXSCH #4-1
1310
1311
1312
1313
Slot
DCI scheduling 4 PXSCHs with starting HARQ PN K
1300
TDRA
$I_{REF}$
$O_1$
$O_2$
$O_3$
$O_4$
NDIs
RVs
HARQ PN
MCS index and offsets HARQ PN
MCS index
K
$I_{REF}+O_1$
(K+1) modulo $N_{HARQ}$
$I_{REF}+O_2$
(K+2) modulo $N_{HARQ}$
$I_{REF}+O_1+O_3$
(K+3) modulo $N_{HARQ}$
$I_{REF}+O_1+O_3+O_4$
PXSCH #1 (New TX)
PXSCH #2-1 (ReTX)
PXSCH #3 (New TX)
PXSCH #4 (New TX)
1410
1411
1412
1413
Slot
DCI scheduling 4 PXSCHs with starting HARQ PN K
1400
TDRA
$I_{REF}$
$O_1$
$O_2$
$O_3$
$O_4$
NDIs
RVs
HARQ PN
MCS index and offsets

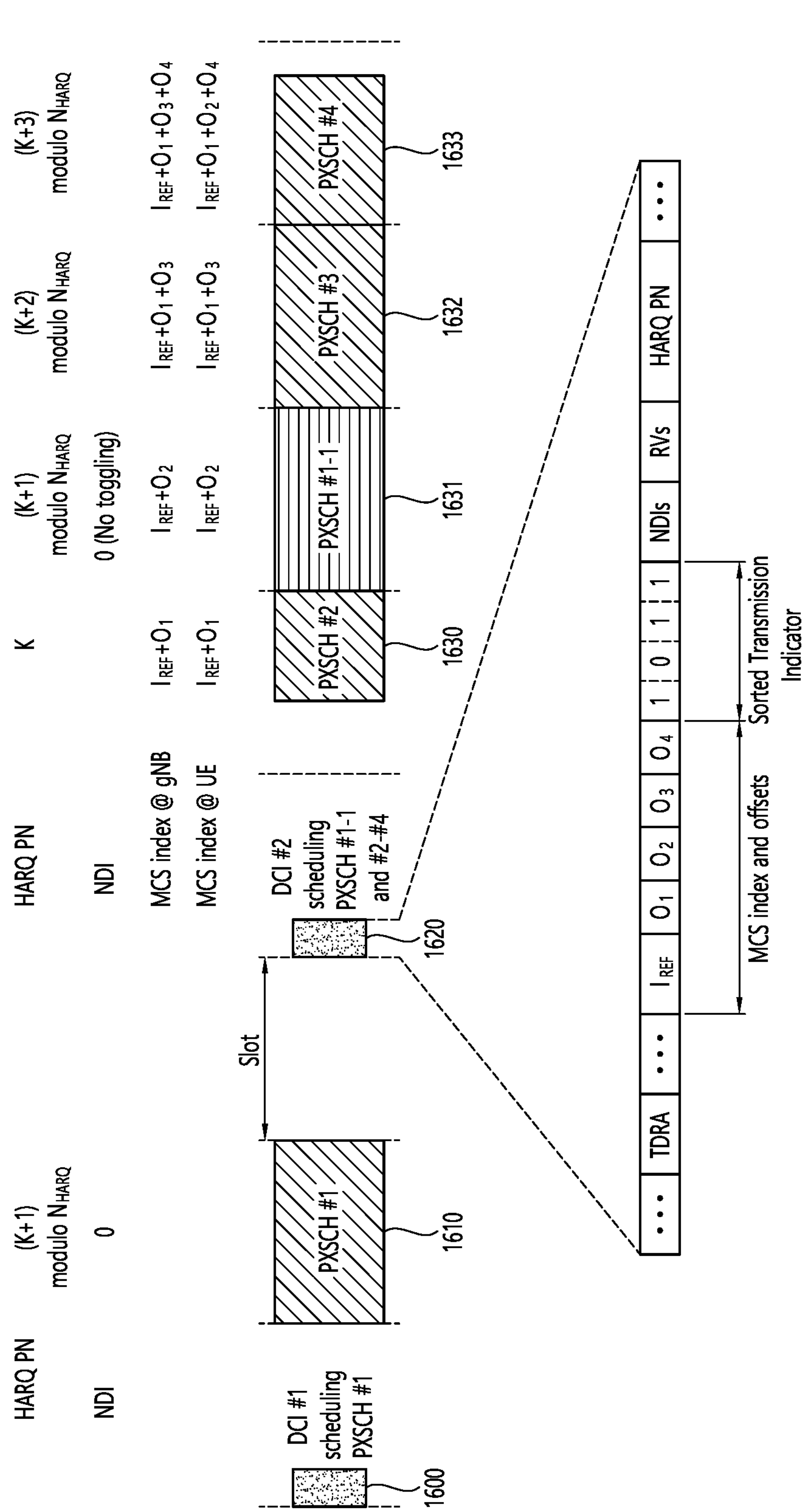
FIG. 16
HARQ PN
NDI
DCI #1 scheduling PXSCH #1
1600
(K+1) modulo N_HARQ
0
PXSCH #1
1610
Slot
DCI #2 scheduling PXSCH #1-1 and #2-#4
1620
HARQ PN
NDI
MCS index @ gNB
MCS index @ UE
K
I_REF+O_1
I_REF+O_1
PXSCH #2
1630
(K+1) modulo N_HARQ
0 (No toggling)
I_REF+O_2
I_REF+O_2
PXSCH #1-1
1631
(K+2) modulo N_HARQ
I_REF+O_1+O_3
I_REF+O_1+O_3
PXSCH #3
1632
(K+3) modulo N_HARQ
I_REF+O_1+O_3+O_4
I_REF+O_1+O_2+O_4
PXSCH #4
1633
• • •
TDRA
• • •
I_REF
O_1
O_2
O_3
O_4
1
0
1
1
NDIs
RVs
HARQ PN
• • •
MCS index and offsets
Sorted Transmission Indicator

MULTI-TTI MULTI-MCS SCHEDULING DCI TRANSMISSION METHOD AND DEVICE

CROSS-REFERENCE TO RELATED APPLICATIONS

This application is the National Stage filing under 35 U.S.C. 371 of International Application No. PCT/KR2021/013383, filed on Sep. 29, 2021.

TECHNICAL FIELD

The present disclosure relates to a method and apparatus for multiple Transmission Time Interval (TTI) multiple Modulation and Coding Scheme (MCS) scheduling Downlink Control Information (DCI) transmission.

BACKGROUND

3rd Generation Partnership Project (3GPP) Long-Term Evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in International Telecommunication Union (ITU) and 3GPP to develop requirements and specifications for New Radio (NR) systems. 3GPP has to identify and develop the technology components needed for successfully standardizing the new RAT timely satisfying both the urgent market needs, and the more long-term requirements set forth by the ITU Radio communication sector (ITU-R) International Mobile Telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced Mobile BroadBand (eMBB), massive Machine Type Communications (mMTC), Ultra-Reliable and Low Latency Communications (URLLC), etc. The NR shall be inherently forward compatible.

As wireless communication technologies and User Equipment (UE) technologies evolve, there is an increasing need to provide multiple services requiring different Quality of Service (QOS) from a single UE and/or to provide a single service consisting of features requiring different QoS. As an example of providing multiple services requiring different QoS on a single UE, a smartphone user may use a Social Networking Service (SNS) or browse the Internet while watching a video. An example of providing a single service consisting of features requiring different QoS is an AR/VR service that provides visual and auditory data, which require different data transmission rates and latencies. Meanwhile, the number of devices connecting to wireless communication networks is increasing rapidly as various types of devices, including autonomous vehicles as well as devices used directly by humans such as smartphones, require wireless communication capabilities. As a result, there is a growing need for wireless access technologies that can support multiple QoS transmissions to multiple UEs.

SUMMARY

In a transmission method that schedules one Physical Uplink Shared channel (PUSCH) with one Downlink Control Information (DCI), the transmission rate of Uplink (UL) data may be degraded. Therefore, multiple Transmission Time Interval (TTI) scheduling, which can schedule multiple PUSCHs with one DCI, may be applied.

The present disclosure provides a method and apparatus for efficiently providing multiple services requiring different QoS and/or a service comprising multiple data streams requiring different QoS within a UE when multiple TTI scheduling is applied.

In an aspect, a method performed by a User Equipment (UE) in a wireless communication system is provided. The method comprises receiving one downlink control information from a network over a downlink control channel. The one downlink control information schedules both a first shared channel and a second shared channel, and the one downlink control information comprises a reference Modulation and Coding Scheme (MCS) index and a first offset value for the reference MCS index. The method comprises communicating with the network over the first shared channel to which a first MCS index is applied. The first MCS index is based on the reference MCS index. The method comprises, after communicating with the network over the first shared channel, communicating with the network over the second shared channel to which a second MCS index greater than the first MCS index is applied. The second MCS index is based on the reference MCS index and the first offset value.

In another aspect, a method performed by a base station in a wireless communication system is provided. The method comprises transmitting one downlink control information to the UE over a downlink control channel. The one downlink control information schedules both a first shared channel and a second shared channel, and the one downlink control information comprises a reference Modulation and Coding Scheme (MCS) index and a first offset value for the reference MCS index. The method comprises communicating with the UE over the first shared channel to which a first MCS index is applied. The first MCS index is based on the reference MCS index. The method comprises, after communicating with the UE over the first shared channel, communicating with the UE over the second shared channel to which a second MCS index greater than the first MCS index is applied. The second MCS index is based on the reference MCS index and the first offset value.

In another aspect, an apparatus implementing the above method is provided.

The present disclosure can have various advantageous effects.

For example, in multiple TTI scheduling, where multiple PXSCHs are scheduled with a single DCI, data can be transmitted using different MCSs for each PXSCH while minimizing the increase in size of the DCI.

For example, when multiple data streams with different target BLERs are scheduled with one DCI and transmitted, the frequency transmission efficiency can be increased and the power consumption of the UE can be lowered while satisfying the data stream-specific QoS.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 2 shows an example of wireless devices to which implementations of the present disclosure are applied.

FIG. 16 shows an example of a UE accurately calculating an MCS index using a sorted transmission indicator bitmap when scheduling initial transmission PXSCHs and retransmission PXSCHs with a single DCI, to which the first implementation of the present disclosure is applied.

DETAILED DESCRIPTION

Figure 1:
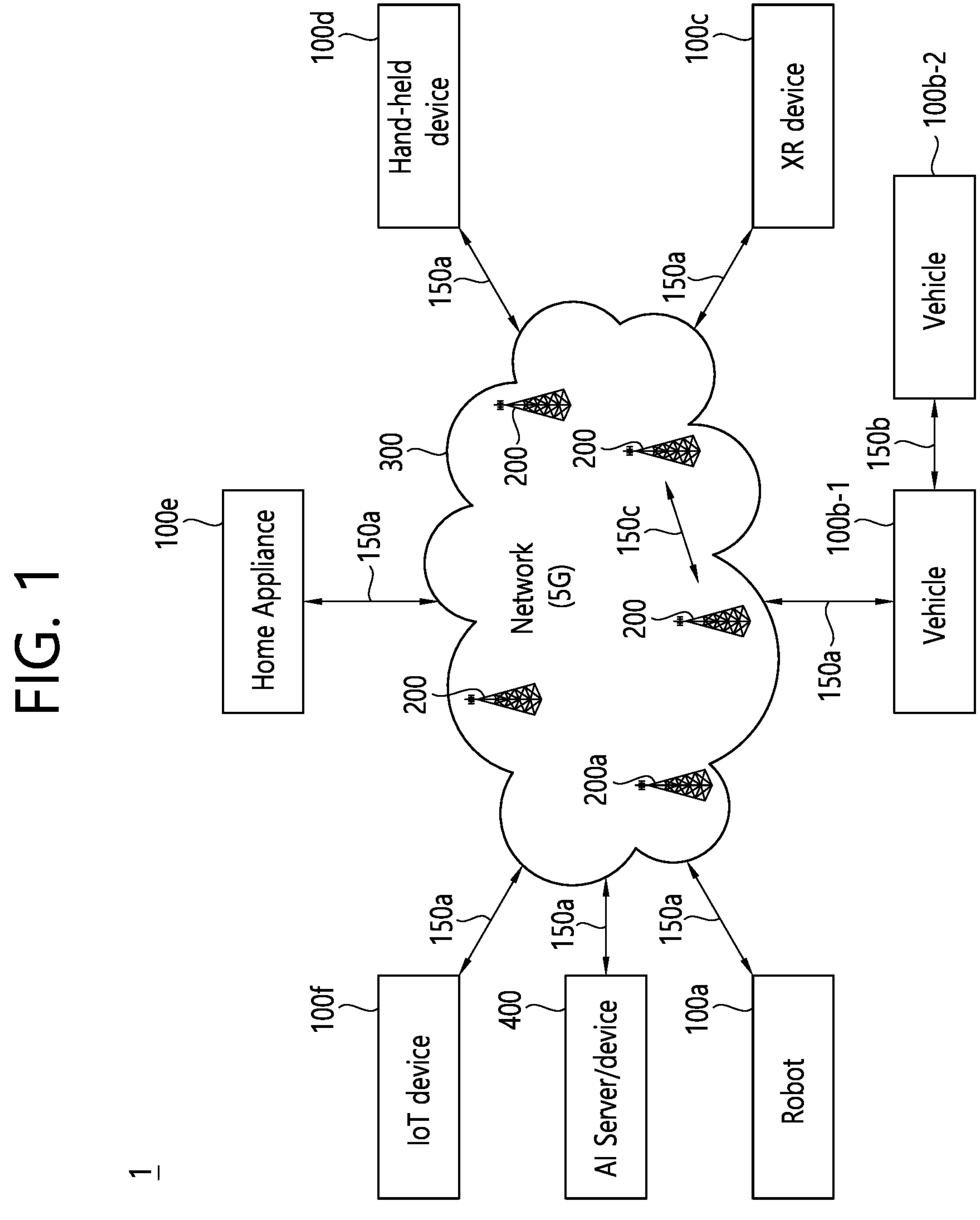
FIG. 1 shows an example of a communication system to which implementations of the present disclosure are applied.

The following techniques, apparatuses, and systems may be applied to a variety of wireless multiple access systems. Examples of the multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi Carrier Frequency Division Multiple Access (MC-FDMA) system. CDMA may be embodied through radio technology such as Universal Terrestrial Radio Access (UTRA) or CDMA2000. TDMA may be embodied through radio technology such as Global System for Mobile communications (GSM), General Packet Radio Service (GPRS), or Enhanced Data rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802.20, or Evolved UTRA (E-UTRA). UTRA is a part of a Universal Mobile Telecommunications System (UMTS). 3rd Generation Partnership Project (3GPP) Long-Term Evolution (LTE) is a part of Evolved UMTS (E-UMTS) using E-UTRA. 3GPP LTE employs OFDMA in downlink (DL) and SC-FDMA in uplink (UL). Evolution of 3GPP LTE includes LTE-Advanced (LTE-A), LTE-A Pro, and/or 5G New Radio (NR).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure are applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced Mobile BroadBand (eMBB), (2) a category of massive Machine Type Communication (mMTC), and (3) a category of Ultra-Reliable and Low Latency Communications (URLLC).

Referring to FIG. 1, the communication system 1 includes wireless devices 100*a* to 100*f*, Base Stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using Radio Access Technology (RAT) (e.g., 5G NR or LTE) and may be referred to as communication/radio/5G devices. The wireless devices 100*a* to 100*f* may include, without being limited to, a robot 100*a*, vehicles 100*b*-1 and 100*b*-2, an extended Reality (XR) device 100*c*, a hand-held device 100*d*, a home appliance 100*e*, an Internet-of-Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. The vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called User Equipments (UEs). A UE may include, for example, a cellular phone, a smartphone, a laptop computer, a digital broadcast terminal, a Personal Digital Assistant (PDA), a Portable Multimedia Player (PMP), a navigation system, a slate Personal Computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a Closed-Circuit TV (CCTV), a recorder, or a black box.

The FinTech device may be, for example, a device capable of providing a financial service such as mobile payment. For example, the FinTech device may include a payment device or a Point of Sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices

100*a* to 100*f* may perform direct communication (e.g., sidelink communication) with each other without passing through the BSs 200/network 300. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or Device-to-Device (D2D) communication) 150*b*, inter-base station communication 150*c* (e.g., relay, Integrated Access and Backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through Computer Graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple Sub-Carrier Spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., Frequency Range 1 (FR1) and Frequency Range 2 (FR2). The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter Wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHZ | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include NarrowBand IoT (NB-IoT) technology for low-power communication as well as LTE, NR and 6G. For example, NB-IoT technology may be an example of Low Power Wide Area Network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced MTC (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate Personal Area Networks (PANs) associated with small/low-power digital communication based on various specifications such as IEEE 802.15.4 and may be called various names.

FIG. 2 shows an example of wireless devices to which implementations of the present disclosure are applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with Radio Frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, Media Access Control (MAC) layer, Radio Link Control (RLC) layer, Packet Data Convergence Protocol (PDCP) layer, Radio Resource Control (RRC) layer, and Service Data Adaptation Protocol (SDAP) layer). The one or more processors 102 and 202 may generate one or more Protocol Data Units (PDUs) and/or one or more Service Data Units (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable ROMs (EEPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in UL and as a receiving device in DL. In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a Node B (NB), an eNode B (eNB), or a gNB.

Figure 3:
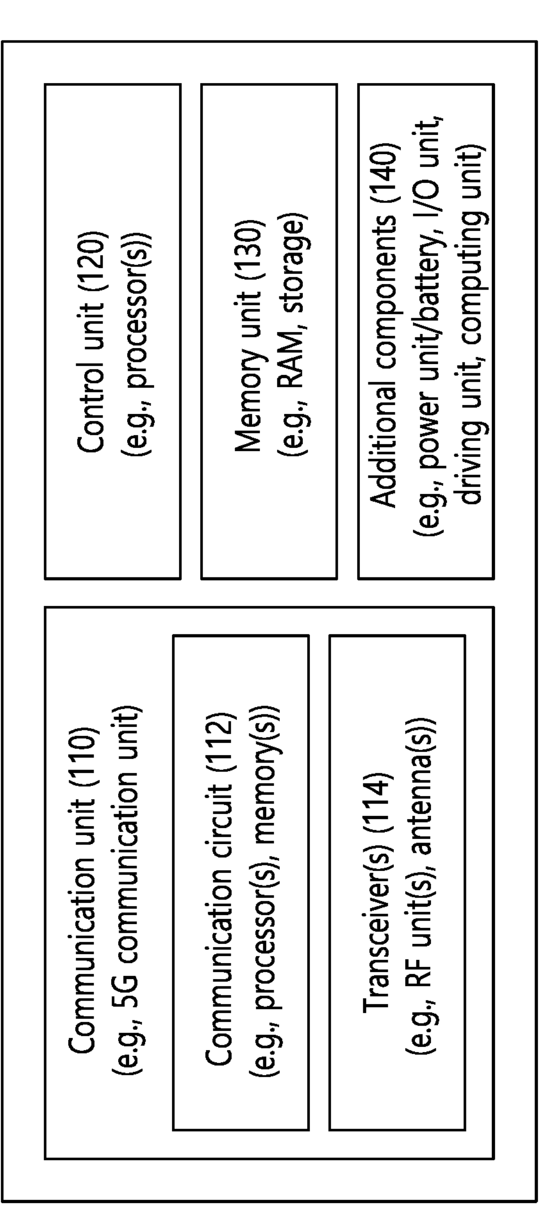
FIG. 3 shows an example of a wireless device to which implementations of the present disclosure are applied.

FIG. 3 shows an example of a wireless device to which implementations of the present disclosure are applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, Input/Output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an Application Processor (AP), an Electronic Control Unit (ECU), a Central Processing Unit (CPU), a Graphical Processing Unit (GPU), and a memory control processor. As another example, the memory unit 130 may be configured by a RAM, a Dynamic RAM (DRAM), a ROM, a flash memory, a volatile memory, a non-volatile memory, and/or a combination thereof.

Figure 4:
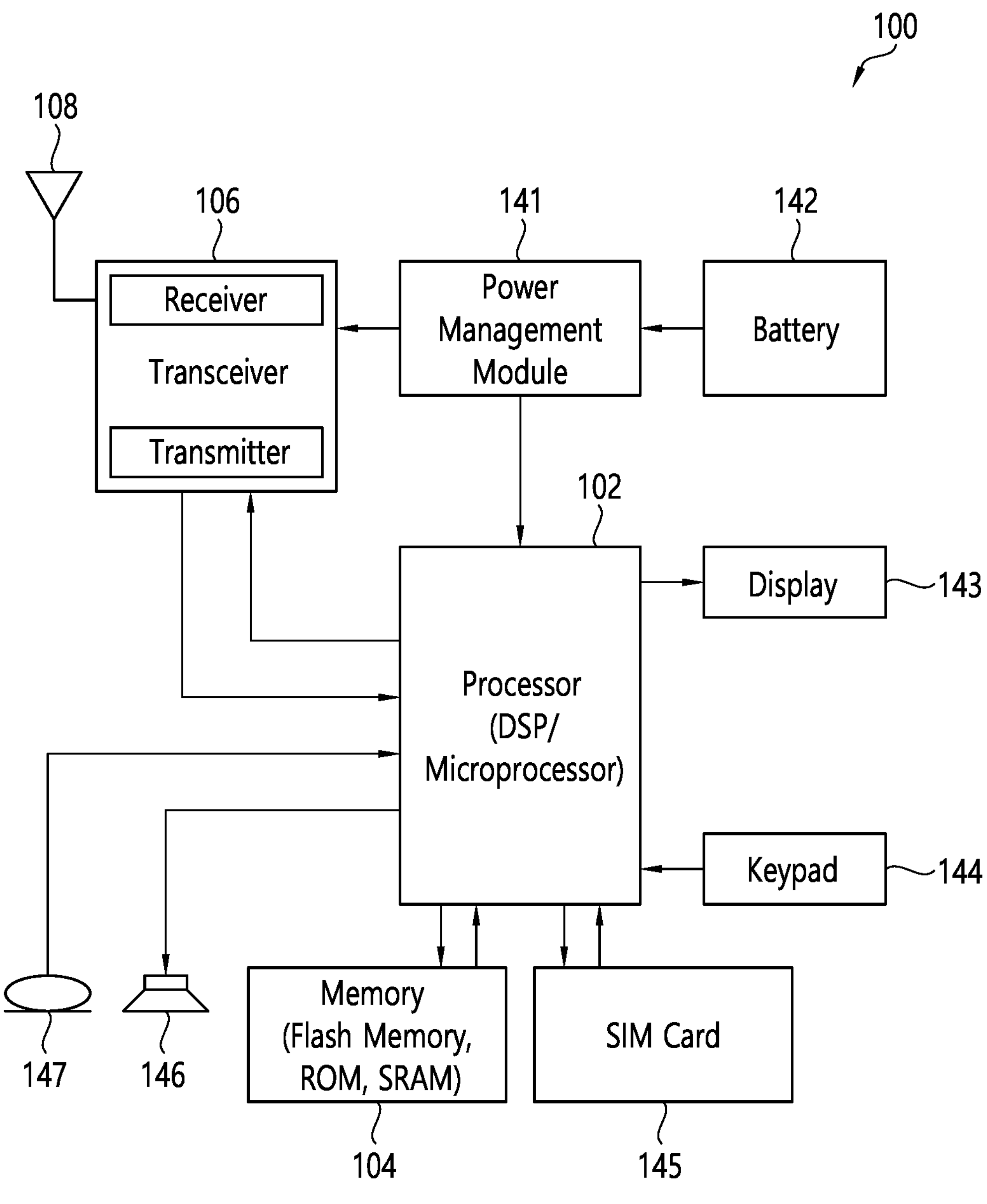
FIG. 4 shows an example of UE to which implementations of the present disclosure are applied.

FIG. 4 shows an example of UE to which implementations of the present disclosure are applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 141, a battery 142, a display 143, a keypad 144, a Subscriber Identification Module (SIM) card 145, a speaker 146, and a microphone 147.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of DSP, CPU, GPU, a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 141 manages power for the processor 102 and/or the transceiver 106. The battery 142 supplies power to the power management module 141.

The display 143 outputs results processed by the processor 102. The keypad 144 receives inputs to be used by the processor 102. The keypad 144 may be shown on the display 143.

The SIM card 145 is an integrated circuit that is intended to securely store the International Mobile Subscriber Identity (IMSI) number and its related key, which are used to identify and authenticate subscribers on mobile telephony devices (such as mobile phones and computers). It is also possible to store contact information on many SIM cards.

The speaker 146 outputs sound-related results processed by the processor 102. The microphone 147 receives sound-related inputs to be used by the processor 102.

Figure 5:
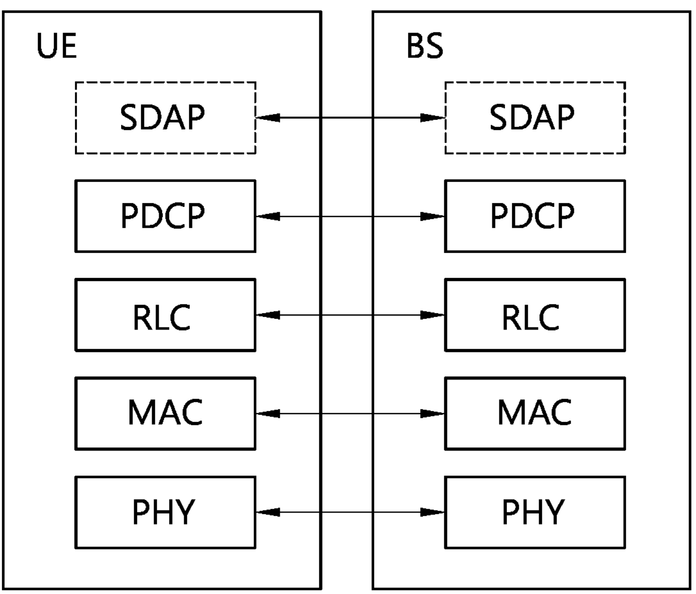
FIGS. 5 and 6 show an example of protocol stacks in a 3GPP based wireless communication system to which implementations of the present disclosure are applied.
Figure 6:
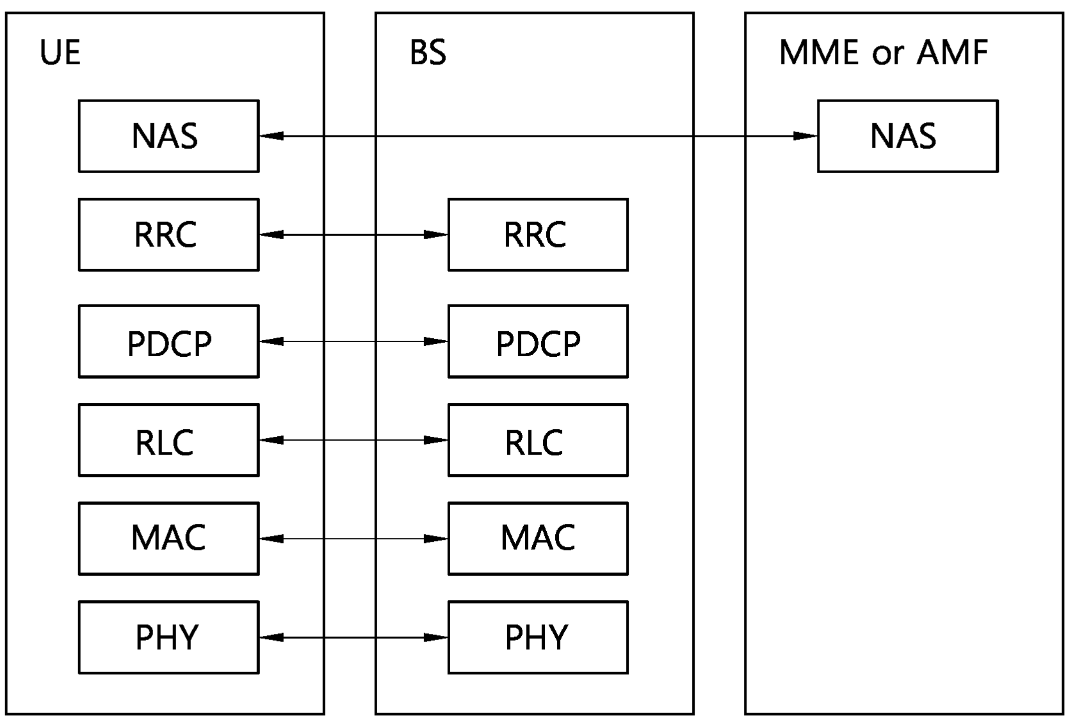

FIGS. 5 and 6 show an example of protocol stacks in a 3GPP based wireless communication system to which implementations of the present disclosure are applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a Non-Access Stratum (NAS) layer. Layer 1, Layer 2 and Layer 3 are referred to as an Access Stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network Quality of Service (QOS) flows.

In the 3GPP NR system, the main services and functions of the MAC sublayer include: mapping between logical channels and transport channels; multiplexing/de-multiplexing of MAC SDUs belonging to one or different logical channels into/from Transport Blocks (TB) delivered to/from the physical layer on transport channels; scheduling information reporting; error correction through Hybrid Automatic Repeat reQuest (HARQ) (one HARQ entity per cell in case of Carrier Aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast Control Channel (BCCH) is a downlink logical channel for broadcasting system control information, Paging Control Channel (PCCH) is a downlink logical channel that transfers paging information, system information change notifications and indications of ongoing Public Warning Service (PWS) broadcasts, Common Control Channel (CCCH) is a logical channel for transmitting control information between UEs and network and used for UEs having no RRC connection with the network, and Dedicated Control Channel (DCCH) is a point-to-point bi-directional logical channel that transmits dedicated control information between a UE and the network and used by UEs having an RRC connection. Dedicated Traffic Channel (DTCH) is a point-to-point logical channel, dedicated to one UE, for the transfer of user information. A DTCH can exist in both uplink and downlink. In downlink, the following connections between logical channels and transport channels exist: BCCH can be mapped to Broadcast Channel (BCH); BCCH can be mapped to Downlink Shared Channel (DL-SCH); PCCH can be mapped to Paging Channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to Uplink Shared Channel (UL-SCH); DCCH can be mapped to UL-SCH; and DTCH can be mapped to UL-SCH.

The RLC sublayer supports three transmission modes: Transparent Mode (TM), Unacknowledged Mode (UM), and Acknowledged Mode (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using Robust Header Compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS Flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5G Core network (5GC) or Next-Generation Radio Access Network (NG-RAN); establishment, maintenance and release of an RRC connection between the UE and NG-RAN; security functions including key management; establishment, configuration, maintenance and release of Signaling Radio Bearers (SRBs) and Data Radio Bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 7:
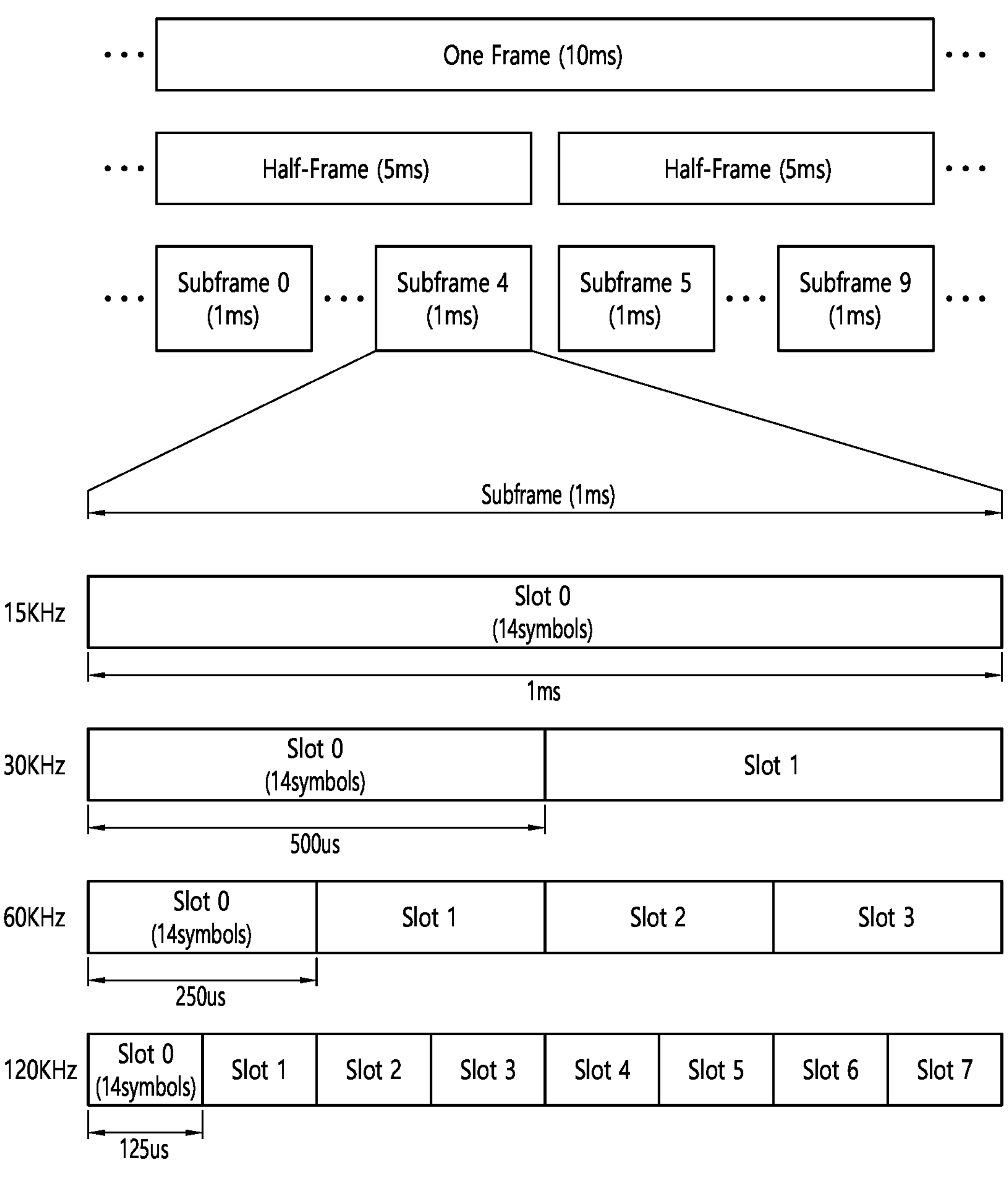
FIG. 7 shows a frame structure in a 3GPP based wireless communication system to which implementations of the present disclosure are applied.

FIG. 7 shows a frame structure in a 3GPP based wireless communication system to which implementations of the present disclosure are applied.

The frame structure shown in FIG. 7 is purely exemplary and the number of subframes, the number of slots, and/or the number of symbols in a frame may be variously changed. In the 3GPP based wireless communication system, OFDM numerologies (e.g., SCS, Transmission Time Interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or Cyclic Prefix (CP)-OFDM symbols), SC-FDMA symbols (or Discrete Fourier Transform-spread-OFDM (DFT-s-OFDM) symbols).

Referring to FIG. 7, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a CP. In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 3 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 3

| u | $N^{slot}{}_{S}{}^{ymb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 4

| u | $N^{slot}{}_{S_{ymb}}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and/subframe,u symb OFDM symbols is defined, starting at Common Resource Block (CRB) $N^{start,u}_{grid}$ indicated by higher-layer signaling (e.g., RRC signaling), where $N^{size,u}_{grid,x}$ is the number of Resource Blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a Resource Element (RE) and one complex symbol may be mapped to each RE. Each RE in the resource grid is uniquely identified by an index k in the frequency domain and an index/representing a symbol location relative to a reference point in the time domain. In the 3GPP based wireless communication system, an RB is defined by 12 consecutive subcarriers in the frequency domain.

In the 3GPP NR system, RBs are classified into CRBs and Physical Resource Blocks (PRBs). CRBs are numbered from 0 and upwards in the frequency domain for subcarrier spacing configuration u. The center of subcarrier 0 of CRB 0 for subcarrier spacing configuration u coincides with ‘point A’ which serves as a common reference point for resource block grids. In the 3GPP NR system, PRBs are defined within a BandWidth Part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE’s operating bandwidth within the cell’s operating bandwidth.

In the PHY layer, the uplink transport channels UL-SCH and Random Access Channel (RACH) are mapped to their physical channels Physical Uplink Shared Channel (PUSCH) and Physical Random Access Channel (PRACH), respectively, and the downlink transport channels DL-SCH, BCH and PCH are mapped to Physical Downlink Shared Channel (PDSCH), Physical Broadcast Channel (PBCH) and PDSCH, respectively. In the PHY layer, Uplink Control Information (UCI) is mapped to PUCCH, and Downlink Control Information (DCI) is mapped to Physical Downlink Control Channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

As the amount of data traffic in cellular mobile communication systems has grown rapidly, technologies have been developed to transmit data over unlicensed spectrum bands. Unlicensed spectrum bands are frequency bands that are not licensed for cellular mobile communications, but are shared with other communications systems such as Wi-Fi. To allow multiple wireless access technologies to coexist, unlicensed frequency bands can use a channel access method based on energy detection behavior. LTE Licensed Assisted Access (LTE-LAA) and NR Unlicensed (NR-U) support Listen Before Talk (LBT) technology, which enables frequency sharing between multiple radio access technologies according to Carrier Sensing Multiple Access/Collision Avoidance (CSMA/CA) procedures.

LBT should always be performed before data can be transmitted in unlicensed frequency bands. In the typical transmission method of scheduling one PUSCH with one DCI, the transmission rate of uplink data may be significantly degraded. Therefore, in LTE enhanced LAA (eLAA)

and/or NR-U, multiple TTI scheduling may be applied, which allows multiple PUSCHs to be scheduled with one DCI.

Furthermore, as the frequency of the carrier increases, phase noise becomes a major factor that degrades the performance of the communication system. The OFDM system employed by NR can mitigate the performance degradation caused by phase noise by widening the subcarrier spacing. For this reason, NR uses wider subcarrier spacing as the frequency of the carrier increases. For the same number of subcarriers, the wider subcarrier spacing reduces the length of the OFDM symbols and the length of a slot consisting of 14 OFDM symbols. If the UE attempts to receive PDCCH in every slot, the power consumption of the UE will also increase as the slot length decreases.

To address this, it may be proposed that the UE attempts to receive PDCCH in multiple slot cycles instead of every slot. However, by increasing the PDCCH reception interval from every slot to multiple slots, the power consumption of the UE can be prevented from increasing, but the data transmission rate may decrease. Therefore, techniques for scheduling multiple PUSCHs and/or PDSCHs with a single DCI, similar to the multiple TTI scheduling in NR-U, are being standardized.

Figure 8:
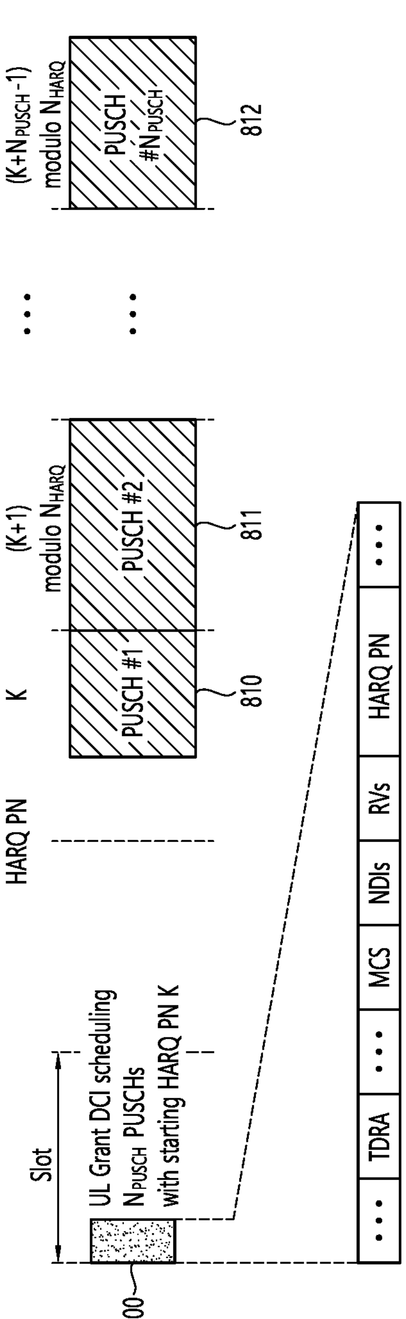
FIG. 8 shows an example of multiple TTI scheduling that schedules multiple PUSCHs with a single DCI to which implementations of the present disclosure are applied.

FIG. 8 shows an example of multiple TTI scheduling that schedules multiple PUSCHs with a single DCI to which implementations of the present disclosure are applied.

The one DCI to schedule a plurality of PUSCHs and/or multiple TTI scheduling shown in FIG. 8 may be used in NR-U. In addition, multiple TTI scheduling is a technique for reducing power consumption of UEs in frequency bands above 52 GHz, and can be applied to PDSCH scheduling as well as PUSCH.

Referring to FIG. 8, the information delivered in the DCI 800 includes a Time Domain Resource Assignment (TDRA), a Modulation and Coding Scheme (MCS), a plurality of New Data Indicators (NDIs), a plurality of Redundancy Versions (RVs), and a Hybrid Automatic Repeat Request (HARQ) Process Number (PN). The TDRA indicates the index of the TDRA table which comprises time domain resource allocation information such as the number of PUSCHs to be scheduled along with the start symbol and length for each PUSCH, etc. The UE may obtain the number of PUSCHs scheduled by each DCI based on the TDRA. The MCS is applied equally to all PUSCHs. The NDI and RV consist of one bit for each PUSCH and as many bits as the maximum number of PUSCHs that can be scheduled by the TDRA table. HARQ PN is the HARQ process number of the first PUSCH, and the HARQ PN of the second and subsequent PUSCHs has a sequential value from the HARQ PN of the first PUSCH. The information included in the DCI 800 shown in FIG. 8 is illustrative only, and other information may be included, and some of the information described in FIG. 8 may be omitted.

Table 5 shows an example of an MCS index table for PUSCH when the modulation order is 64 Quadrature Amplitude Modulation (QAM).

TABLE 5

| MCS Index $I_{MCS}$ | Modulation Order $Q_m$ | Target code Rate R × 1024 | Spectral efficiency |
|---|---|---|---|
| 0 | q | 240/q | 0.2344 |
| 1 | q | 314/q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 134 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | q | reserved | |
| 29 | 2 | reserved | |
| 30 | 4 | reserved | |
| 31 | 6 | reserved | |

Referring to FIG. 8, the DCI 800 schedules $N_{PUSCH}$ number of PUSCHs starting with HARQ PN K. The first PUSCH, PUSCH #1 810, corresponds to HARQ PN K. The HARQ PNs of the second and subsequent PUSCHs are calculated by a modulo operation from the HARQ PN K. For example, the HARQ PN of the second PUSCH, PUSCH #2 811, is calculated as (K+1) modulo $N_{HARQ}$, and the HARQ PN of the $N_{PUSCH}$-th PUSCH, PUSCH #$N_{PUSCH}$ 812, is calculated as $(K+N_{PUSCH}-1)$ modulo $N_{HARQ}$. $N_{HARQ}$ is the number of HARQ processes in operation.

As described above, in multiple TTI scheduling, where multiple PUSCHs and/or multiple PDSCHs (hereinafter referred to as PUSCHs and PDSCHs collectively as PXSCHs) are scheduled by a single DCI, the same MCS may be applied to all of the multiple PXSCHs. That is, the data transmitted over each PXSCH will have the same physical transmission quality, even though the transmission quality required for the data transmitted over each PXSCH may be different (e.g., Block Error Rate (BLER), latency, etc.).

If multiple PXSCHs scheduled by a single DCI are all subject to the same MCS, it may be difficult to use radio resources efficiently, resulting in inefficient transmission and difficulty in ensuring transmission quality. For example, when transmitting two data streams with different target BLERs, to satisfy both target BLERs, the MCS should be determined based on the lower target BLER, which may result in excessive radio resources being allocated for the logical channel requiring the higher target BLER. Conversely, if the MCS is determined based on a high target BLER, the BLER of logical channels requiring lower target BLER may increase, resulting in transmission delays or, in the worst case, transmission failures. If a transmission failure occurs at the physical layer, it should be recovered by ARQ procedures at higher layers such as RLC, which requires additional radio resources and may significantly increase transmission delay.

To address this, it may be proposed that data streams requiring different QoS are scheduled with different DCIs. In this case, different MCSs are applied to data streams that require different QoS, which allows efficient use of radio resources, but the number of PDCCHs that need to be used increases by the number of data streams. The PDCCH is an additional channel for transmitting the actual data, and the increase in resources used for PDCCH may result in a decrease in overall system capacity. In addition, the number of PDCCHs and PXSCHs that a UE should process at any one time increases, which may increase system complexity and power usage. In particular, this may become an increasingly important issue in the future as the number of services supported simultaneously by a single UE increases and the number of UEs that need to be supported simultaneously in a wireless communication network increases.

Hereinafter, methods and apparatus are described that, in accordance with implementations of the present disclosure, can efficiently transmit multiple QoS data streams by applying different MCSs for each PXSCH while minimizing the increase in DCI size in multiple TTI scheduling where a single DCI schedules a plurality of PXSCHs.

In multiple TTI scheduling, where a single DCI is used to schedule a plurality of PXSCHs, applying a different MCS for each PXSCH to transmit a plurality of logical channels with different QoS may significantly increase the size of the DCI because as many MCSs as the number of PXSCHs being scheduled are required. Therefore, there is a need for a technique that can transmit PXSCHs with different MCSs depending on the required QoS without increasing the size of the DCI.

The lower the MCS of the PXSCH, i.e., the lower order modulation scheme and lower encoding rate used, the lower the BLER. Lower BLER also reduces transmission delay because it increases the probability of successful data transmission with fewer transmissions. Therefore, the higher the desired transmission reliability and the lower the desired transmission latency, the lower the MCS should be used.

According to implementations of the present disclosure, different MCSs may be applied for each PXSCH in multiple TTI scheduling. Further, according to implementations of the present disclosure, to minimize the increase in DCI size due to the increase in the amount of information associated with the MCS, the required MCS for each logical channel with data to be transmitted may be determined, the determined MCS may be sorted in ascending order, and the logical channels may be transmitted sequentially over the PXSCHs according to the sorted MCS order. In this case, the MCSs of each PXSCH may be sorted in ascending order, and only the difference between the lowest MCS (e.g., the reference MCS) and the MCS of each PXSCH may be transmitted over the DCI to minimize the increase in DCI size.

More specifically, when transmitting a plurality of logical channels with different QoS over a plurality of PXSCHs scheduled with a single DCI, the overall transmission quality and efficiency can be improved by transmitting logical channels that require high transmission reliability and low transmission delay at lower MCSs earlier in time, and transmitting logical channels that require low transmission reliability and high transmission delay at higher MCSs later in time. When transmitted in this manner, the MCS of the first transmitted PXSCH and the MCS of the later transmitted PXSCH are sorted in a monotonically increasing order from lower to higher values. In this case, the MCS of the first transmitted PXSCH may be transmitted via DCI, and the MCS of the later transmitted PXSCH may be transmitted via DCI by expressing only the difference between the MCS of the first transmitted PXSCH and the MCS of the later transmitted PXSCH. Accordingly, the DCI may be transmitted with fewer bits, without loss of information associated with the MCS.

According to implementations of the present disclosure, in the case of retransmissions, it may be difficult to transmit logical channels in ascending order of the MCSs, so the increase in DCI size may be minimized by transmitting the difference value from the reference MCS without sorting the logical channels in ascending order of the MCSs.

According to implementations of the present disclosure, new information included in the DCI and procedures may be defined to distinguish between cases in which logical channels are transmitted in ascending order of MCS, such as initial transmissions, and cases in which they are not, such as retransmissions.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

Figure 9:
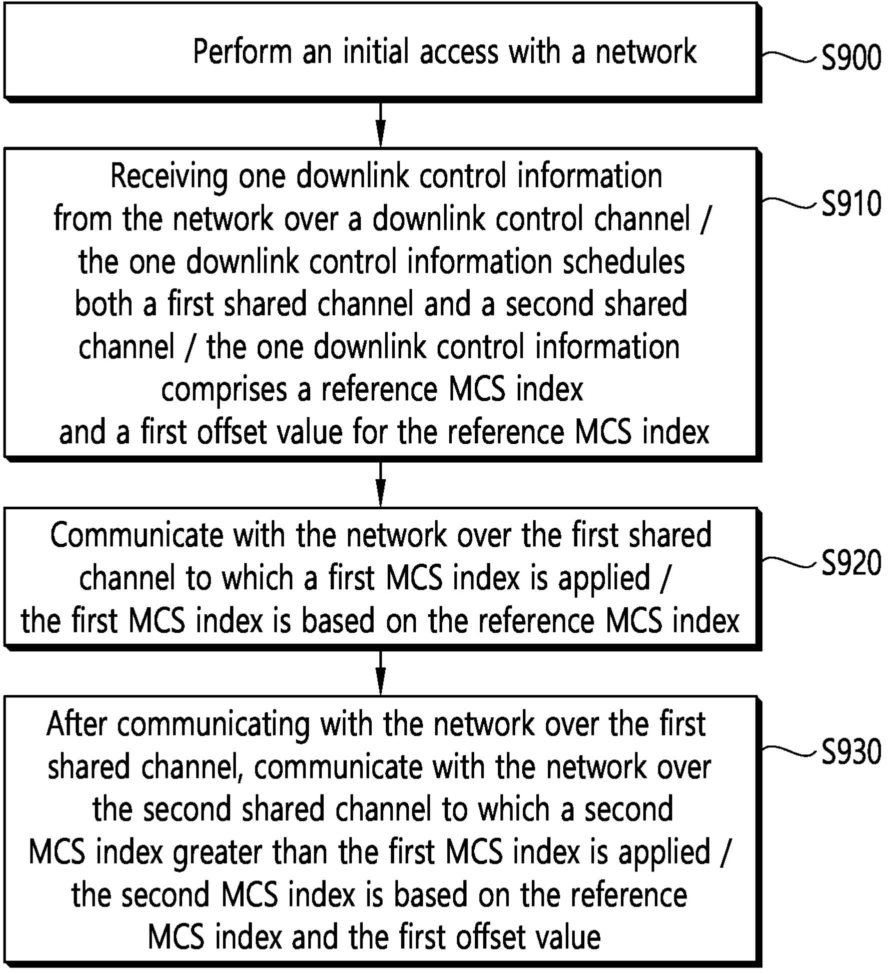
FIG. 9 shows an example of a method performed by a UE to which implementations of the present disclosure are applied.

FIG. 9 shows an example of a method performed by a UE to which implementations of the present disclosure are applied.

In step S900, the method comprises performing an initial access with a network.

In step S910, the method comprises receiving one downlink control information from the network over a downlink control channel. The one downlink control information schedules both a first shared channel and a second shared channel, and the one downlink control information comprises a reference MCS index and a first offset value for the reference MCS index.

In step S920, the method comprises communicating with the network over the first shared channel to which a first MCS index is applied. The first MCS index is based on the reference MCS index.

In step S930, the method comprises, after communicating with the network over the first shared channel, communicating with the network over the second shared channel to which a second MCS index greater than the first MCS index is applied. The second MCS index is based on the reference MCS index and the first offset value.

In some implementations, the first MCS index may be same as the reference MCS index, and the second MCS index may be equal to the reference MCS index plus the first offset value.

In some implementations, the method may further comprise, communicating with the network over a third shared channel to which a third MCS index greater than the first MCS index is applied. The one downlink control information may schedule the third shared channel, and the one downlink control information may comprise a second offset value for the reference MCS index.

In some implementations, a communication over the third shared channel may be an initial transmission of data. Based on the communication over the third shared channel being the initial transmission of data, the third MCS index may be greater than the second MCS index, and the third MCS index may be equal to the reference MCS index plus the first offset value and the second offset value.

In some implementations, a communication over the third shared channel may be a retransmission of data. Based on the communication over the third shared channel being the retransmission of data, the third MCS index may be equal to the reference MCS index plus the second offset value.

In some implementations, the one downlink control information may comprise a Sorted Transmission Indicator (STI) for each of the first shared channel, the second shared channel, and the third shared channel. A value of the sorted transmission indicator may be 1 for shared channels whose MCS indices are sorted in ascending order, and a value of the sort transmission indicator may be 0 for shared channels whose MCS indices are not sorted in ascending order. When the one downlink control information includes the STI of each of the shared channels, the MCS indices of each of the shared channels may not be sorted in ascending order (i.e., unsorted transmission), even though the communication over each of the shared channels corresponds to an initial transmission of data. Furthermore, when the one downlink control information includes the STI of each of the shared channels, the MCS indices of each of the shared channels may be sorted in ascending order (i.e., sorted transmission), even though the communication over each of the shared channels corresponds to retransmission of data.

In some implementations, the one downlink control information may comprise an Unsorted Transmission Indicator (UTI) indicating whether MCS indices applied to the first shared channel, the second shared channel, and the third shared channel are sorted in ascending order.

For example, there may be a shared channel whose MCS indices are not sorted in ascending order from among the first shared channel, the second shared channel, and the third shared channel. In this case, a value of the unsorted transmission indicator may be 1, and the one downlink control information may comprise a sorted transmission indicator.

For example, MCS indices applied to the first shared channel, the second shared channel, and the third shared channel may be sorted in ascending order. In this case, a value of the unsorted transmission indicator may be 0, and the one downlink control information may not comprise a sorted transmission indicator.

In some implementations, $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information may be configured by RRC from the network, and a sum of total number of bits indicating an offset value from the reference MCS index may not exceed $N_{Total\text{-}Offset\text{-}Bits}$.

In some implementations, $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information may be dynamically determined by the UE, and a sum of total number of bits indicating an offset value from the reference MCS index may not exceed $N_{Total\text{-}Offset\text{-}Bits}$.

In some implementations, the shared channel may be a downlink shared channel (e.g., PDSCH) or an uplink shared channel (e.g., PUSCH) or a sidelink shared channel (e.g., PSSCH).

Furthermore, the method in perspective of the UE described above in FIG. 9 may be performed by the first wireless device 100 shown in FIG. 2, the wireless device 100 shown in FIG. 3, and/or the UE 100 shown in FIG. 4.

More specifically, the UE comprises at least one transceiver, at least one processor, and at least one memory operably connectable to the at least one processor. The at least one memory stores instructions that, based on being executed by the at least one processor, perform operations below.

The UE performs an initial access with a network.

The UE receives, via the at least one transceiver, one downlink control information from the network over a downlink control channel. The one downlink control information schedules both a first shared channel and a second shared channel, and the one downlink control information comprises a reference MCS index and a first offset value for the reference MCS index.

The UE communicates, via the at least one transceiver, with the network over the first shared channel to which a first MCS index is applied. The first MCS index is based on the reference MCS index.

After communicating with the network over the first shared channel, the UE communicates, via the at least one transceiver, with the network over the second shared channel to which a second MCS index greater than the first MCS index is applied. The second MCS index is based on the reference MCS index and the first offset value.

In some implementations, the first MCS index may be same as the reference MCS index, and the second MCS index may be equal to the reference MCS index plus the first offset value.

In some implementations, the UE may further communicate with the network over a third shared channel to which a third MCS index greater than the first MCS index is applied. The one downlink control information may schedule the third shared channel, and the one downlink control information may comprise a second offset value for the reference MCS index.

In some implementations, a communication over the third shared channel may be an initial transmission of data. Based on the communication over the third shared channel being the initial transmission of data, the third MCS index may be greater than the second MCS index, and the third MCS index may be equal to the reference MCS index plus the first offset value and the second offset value.

In some implementations, a communication over the third shared channel may be a retransmission of data. Based on the communication over the third shared channel being the retransmission of data, the third MCS index may be equal to the reference MCS index plus the second offset value.

In some implementations, the one downlink control information may comprise a Sorted Transmission Indicator (STI) for each of the first shared channel, the second shared channel, and the third shared channel. A value of the sorted transmission indicator may be 1 for shared channels whose MCS indices are sorted in ascending order, and a value of the sort transmission indicator may be 0 for shared channels whose MCS indices are not sorted in ascending order. When the one downlink control information includes the STI of each of the shared channels, the MCS indices of each of the shared channels may not be sorted in ascending order (i.e., unsorted transmission), even though the communication over each of the shared channels corresponds to an initial transmission of data. Furthermore, when the one downlink control information includes the STI of each of the shared channels, the MCS indices of each of the shared channels may be sorted in ascending order (i.e., sorted transmission), even though the communication over each of the shared channels corresponds to retransmission of data.

In some implementations, the one downlink control information may comprise an Unsorted Transmission Indicator (UTI) indicating whether MCS indices applied to the first shared channel, the second shared channel, and the third shared channel are sorted in ascending order.

For example, there may be a shared channel whose MCS indices are not sorted in ascending order from among the first shared channel, the second shared channel, and the third shared channel. In this case, a value of the unsorted transmission indicator may be 1, and the one downlink control information may comprise a sorted transmission indicator.

For example, MCS indices applied to the first shared channel, the second shared channel, and the third shared channel may be sorted in ascending order. In this case, a value of the unsorted transmission indicator may be 0, and the one downlink control information may not comprise a sorted transmission indicator.

In some implementations, $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information may be configured by RRC from the network, and a sum of total number of bits indicating an offset value from the reference MCS index may not exceed $N_{Total\text{-}Offset\text{-}Bits}$.

In some implementations, $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information may be dynamically determined by the UE, and a sum of total number of bits indicating an offset value from the reference MCS index may not exceed $N_{Total\text{-}Offset\text{-}Bits}$.

In some implementations, the shared channel may be a downlink shared channel (e.g., PDSCH) or an uplink shared channel (e.g., PUSCH) or a sidelink shared channel (e.g., PSSCH).

Furthermore, the method in perspective of the UE described above in FIG. 9 may be performed by control of the processor 102 included in the first wireless device 100 shown in FIG. 2, by control of the communication unit 110 and/or the control unit 120 included in the wireless device 100 shown in FIG. 3, and/or by control of the processor 102 included in the UE 100 shown in FIG. 4.

More specifically, a processing apparatus operating in a wireless communication system comprises at least one processor, and at least one memory operably connectable to the at least one processor. The at least one processor is adapted to perform operations comprising: obtaining one downlink control information which schedules both a first shared channel and a second shared channel: communicating over the first shared channel to which a first MCS index is applied; and after communicating over the first shared channel, communicating over the second shared channel to which a second MCS index greater than the first MCS index is applied. The one downlink control information comprises a reference MCS index and a first offset value for the reference MCS index. The first MCS index is based on the reference MCS index. The second MCS index is based on the reference MCS index and the first offset value.

Furthermore, the method in perspective of the UE described above in FIG. 9 may be performed by a software code 105 stored in the memory 104 included in the first wireless device 100 shown in FIG. 2.

The technical features of the present disclosure may be embodied directly in hardware, in a software executed by a processor, or in a combination of the two. For example, a method performed by a wireless device in a wireless communication may be implemented in hardware, software, firmware, or any combination thereof. For example, a software may reside in RAM, flash memory, ROM, EPROM, EEPROM, registers, hard disk, a removable disk, a CD-ROM, or any other storage medium.

Some example of storage medium may be coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include RAM such as synchronous dynamic random access memory (SDRAM), ROM, non-volatile random access memory (NVRAM), EEPROM, flash memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some implementations of the present disclosure, a non-transitory computer-readable medium (CRM) has stored thereon a plurality of instructions.

More specifically, CRM stores instructions that, based on being executed by at least one processor, perform operations comprising: obtaining one downlink control information which schedules both a first shared channel and a second shared channel; communicating over the first shared channel to which a first MCS index is applied; and after communicating over the first shared channel, communicating over the second shared channel to which a second MCS index greater than the first MCS index is applied. The one downlink control information comprises a reference MCS index and a first offset value for the reference MCS index. The first MCS index is based on the reference MCS index. The second MCS index is based on the reference MCS index and the first offset value.

Figure 10:
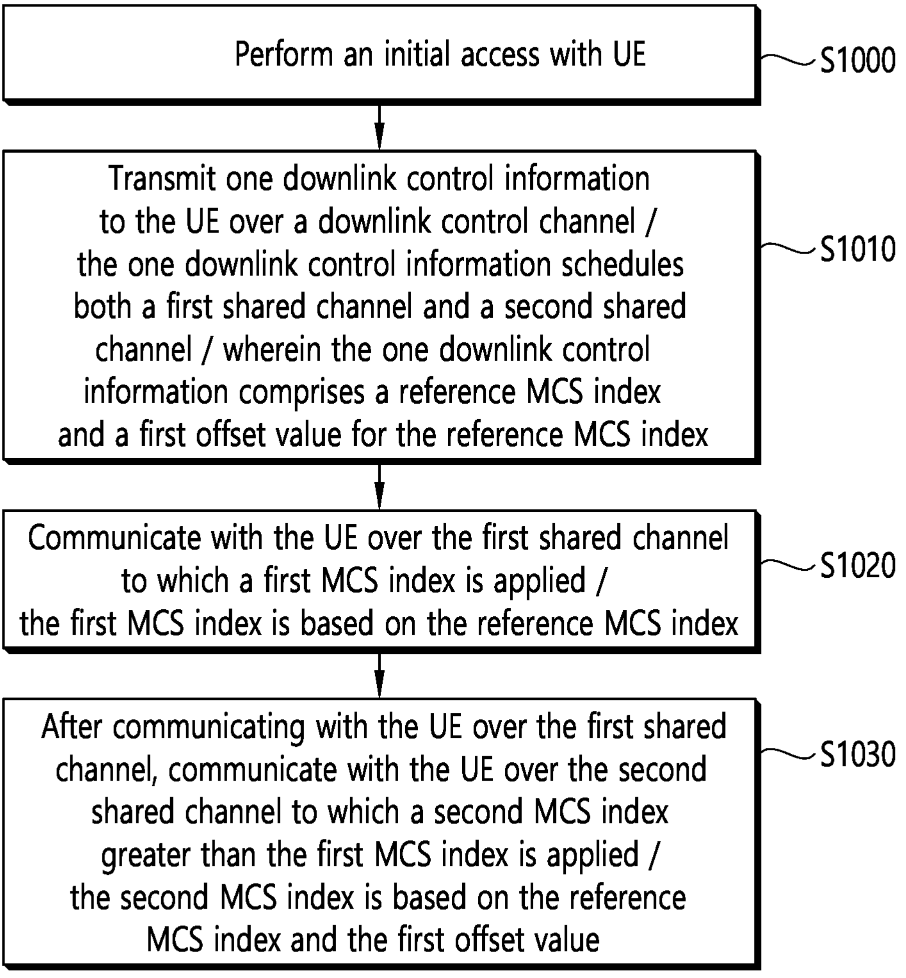
FIG. 10 shows an example of a method performed by a base station to which implementations of the present disclosure are applied.

FIG. 10 shows an example of a method performed by a base station to which implementations of the present disclosure are applied.

In step S1000, the method comprises performing an initial access with a UE.

In step S1010, the method comprises transmitting one downlink control information to the UE over a downlink control channel. The one downlink control information schedules both a first shared channel and a second shared channel, and the one downlink control information comprises a reference MCS index and a first offset value for the reference MCS index.

In step S1020, the method comprises communicating with the UE over the first shared channel to which a first MCS index is applied. The first MCS index is based on the reference MCS index.

In step S1030, the method comprises, after communicating with the UE over the first shared channel, communicating with the UE over the second shared channel to which a second MCS index greater than the first MCS index is applied. The second MCS index is based on the reference MCS index and the first offset value.

In some implementations, the first MCS index may be same as the reference MCS index, and the second MCS index may be equal to the reference MCS index plus the first offset value.

In some implementations, the method may further comprise, communicating with the UE over a third shared channel to which a third MCS index greater than the first MCS index is applied. The one downlink control information may schedule the third shared channel, and the one downlink control information may comprise a second offset value for the reference MCS index.

In some implementations, a communication over the third shared channel may be an initial transmission of data. Based on the communication over the third shared channel being the initial transmission of data, the third MCS index may be greater than the second MCS index, and the third MCS index may be equal to the reference MCS index plus the first offset value and the second offset value.

In some implementations, a communication over the third shared channel may be a retransmission of data. Based on the communication over the third shared channel being the retransmission of data, the third MCS index may be equal to the reference MCS index plus the second offset value.

In some implementations, the one downlink control information may comprise a STI for each of the first shared channel, the second shared channel, and the third shared channel. A value of the sorted transmission indicator may be 1 for shared channels whose MCS indices are sorted in ascending order, and a value of the sort transmission indicator may be 0 for shared channels whose MCS indices are not sorted in ascending order. When the one downlink control information includes the STI of each of the shared channels, the MCS indices of each of the shared channels may not be sorted in ascending order (i.e., unsorted transmission), even though the communication over each of the shared channels corresponds to an initial transmission of data. Furthermore, when the one downlink control information includes the STI of each of the shared channels, the MCS indices of each of the shared channels may be sorted in ascending order (i.e., sorted transmission), even though the communication over each of the shared channels corresponds to retransmission of data.

In some implementations, the one downlink control information may comprise an UTI indicating whether MCS indices applied to the first shared channel, the second shared channel, and the third shared channel are sorted in ascending order.

For example, there may be a shared channel whose MCS indices are not sorted in ascending order from among the first shared channel, the second shared channel, and the third shared channel. In this case, a value of the unsorted transmission indicator may be 1, and the one downlink control information may comprise a sorted transmission indicator.

For example, MCS indices applied to the first shared channel, the second shared channel, and the third shared channel may be sorted in ascending order. In this case, a value of the unsorted transmission indicator may be 0, and the one downlink control information may not comprise a sorted transmission indicator.

In some implementations, the shared channel may be a downlink shared channel (e.g., PDSCH) or an uplink shared channel (e.g., PUSCH) or a sidelink shared channel (e.g., PSSCH).

Furthermore, the method in perspective of the base station described above in FIG. 10 may be performed by the second wireless device 200 shown in FIG. 2, and/or the wireless device 100 shown in FIG. 3.

More specifically, the base station comprises at least one transceiver, at least one processor, and at least one memory operably connectable to the at least one processor. The at least one memory stores instructions that, based on being executed by the at least one processor, perform operations below.

The base station performs an initial access with a UE.

The base station transmits one downlink control information to the UE over a downlink control channel. The one downlink control information schedules both a first shared channel and a second shared channel, and the one downlink control information comprises a reference MCS index and a first offset value for the reference MCS index.

The base station communicates with the UE over the first shared channel to which a first MCS index is applied. The first MCS index is based on the reference MCS index.

After communicating with the UE over the first shared channel, the base station communicates with the UE over the second shared channel to which a second MCS index greater than the first MCS index is applied. The second MCS index is based on the reference MCS index and the first offset value.

In some implementations, the first MCS index may be same as the reference MCS index, and the second MCS index may be equal to the reference MCS index plus the first offset value.

In some implementations, the base station may further communicate with the UE over a third shared channel to which a third MCS index greater than the first MCS index is applied. The one downlink control information may schedule the third shared channel, and the one downlink control information may comprise a second offset value for the reference MCS index.

In some implementations, a communication over the third shared channel may be an initial transmission of data. Based on the communication over the third shared channel being the initial transmission of data, the third MCS index may be greater than the second MCS index, and the third MCS index may be equal to the reference MCS index plus the first offset value and the second offset value.

In some implementations, a communication over the third shared channel may be a retransmission of data. Based on the communication over the third shared channel being the retransmission of data, the third MCS index may be equal to the reference MCS index plus the second offset value.

In some implementations, the one downlink control information may comprise a STI for each of the first shared channel, the second shared channel, and the third shared channel. A value of the sorted transmission indicator may be 1 for shared channels whose MCS indices are sorted in ascending order, and a value of the sort transmission indicator may be 0 for shared channels whose MCS indices are not sorted in ascending order. When the one downlink control information includes the STI of each of the shared channels, the MCS indices of each of the shared channels may not be sorted in ascending order (i.e., unsorted transmission), even though the communication over each of the shared channels corresponds to an initial transmission of data. Furthermore, when the one downlink control information includes the STI of each of the shared channels, the MCS indices of each of the shared channels may be sorted in ascending order (i.e., sorted transmission), even though the communication over each of the shared channels corresponds to retransmission of data.

In some implementations, the one downlink control information may comprise an UTI indicating whether MCS indices applied to the first shared channel, the second shared channel, and the third shared channel are sorted in ascending order.

For example, there may be a shared channel whose MCS indices are not sorted in ascending order from among the first shared channel, the second shared channel, and the third shared channel. In this case, a value of the unsorted transmission indicator may be 1, and the one downlink control information may comprise a sorted transmission indicator.

For example, MCS indices applied to the first shared channel, the second shared channel, and the third shared channel may be sorted in ascending order. In this case, a value of the unsorted transmission indicator may be 0, and the one downlink control information may not comprise a sorted transmission indicator.

In some implementations, the shared channel may be a downlink shared channel (e.g., PDSCH) or an uplink shared channel (e.g., PUSCH) or a sidelink shared channel (e.g., PSSCH).

Various implementations of the present disclosure will be described below with reference to the drawings.

1. First Implementation

A first implementation of the present disclosure provides various examples of configuring a DCI to schedule a plurality of PXSCHs in multiple TTI scheduling.

Figure 11:
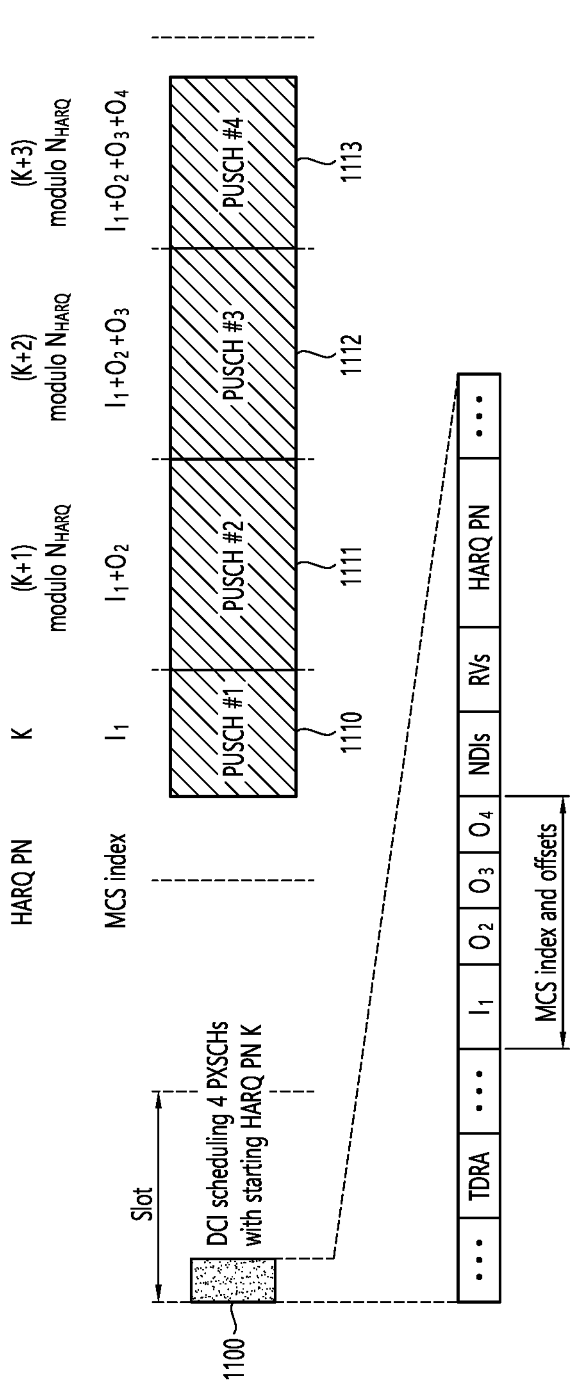
FIG. 11 shows an example of a method of delivering MCS information when scheduling a plurality of PXSCHs with a single DCI, to which the first implementation of the present disclosure is applied.

FIG. 11 shows an example of a method of delivering MCS information when scheduling a plurality of PXSCHs with a single DCI, to which the first implementation of the present disclosure is applied.

Referring to FIG. 11, a DCI 1100 is transmitted that schedules four PXSCHs starting with HARQ PN K. The DCI 1100 schedules PXSCH #1 1110 corresponding to HARQ PN K, PXSCH #2 1111 corresponding to HARQ PN (K+1) modulo $N_{HARQ}$, PXSCH #3 1112 corresponding to HARQ PN (K+2) modulo $N_{HARQ}$, and PXSCH #4 1113 corresponding to HARQ PN (K+3) modulo $N_{HARQ}$.

Depending on the QoS of the data to be transmitted (e.g., transmission reliability, latency, etc.), the data to be transmitted with the lowest MCS (i.e., corresponding to high transmission reliability and low latency) is mapped to PXSCH #1 1110, and the data to be transmitted with the highest MCS (i.e., corresponding to low transmission reliability and high latency) is mapped to PXSCH #4 1113. Thus, the MCS indices of PXSCH #1 1110, PXSCH #2 1111, PXSCH #3 1112, and PXSCH #4 1113 are sorted in ascending order. The MCS indices of PXSCH #1 1110, PXSCH #2 1111, PXSCH #3 1112, and PXSCH #4 1113 may be represented by $I_1$, $I_2$, $I_3$, and $I_4$, respectively ($I_1 \leq I_2 \leq I_3 \leq I_4$).

If the MCS indices $I_1$, $I_2$, $I_3$, and $I_4$ of PXSCH #1 1110, PXSCH #2 1111, PXSCH #3 1112, and PXSCH #4 1113 are included in the DCI as they are, the size of the DCI will be large. To avoid this, the MCS index $I_1$ of PXSCH #1 1110 may be included in the DCI 1100, and the MCS indices of subsequent PXSCHs may be represented only by their difference from the MCS index of the immediately preceding PXSCH, and that difference may be included in the DCI 1100. Using the MCS index $I_1$ of PXSCH #1 1110 and subsequent difference values transmitted via DCI 1100, the UE may calculate the MCS index of each PXSCH.

For example, in FIG. 11, the DCI 1100 includes the MCS index $I_1$ of PXSCH #1 1110. The MCS index $I_2$ of PXSCH #2 1111 may be expressed as $I_2=I_1+O_2$, whereby DCI 1100 includes $O_2$ instead of the MCS index $I_2$ of PXSCH #1 1111. That is, $O_2$ is the MCS index $I_2$ of PXSCH #2 1111 minus the MCS index $I_1$ of PXSCH #1 1110. The MCS index $I_3$ of PXSCH #3 1112 may be expressed as $I_3=I_1+O_2+O_3$, whereby DCI 1100 includes $O_3$ instead of the MCS index $I_3$ of PXSCH #3 1112. That is, $O_3$ is the MCS index $I_3$ of PXSCH #3 1112 minus the MCS index $I_2$ of PXSCH #2 1111. The MCS index $I_4$ of PXSCH #4 1113 may be expressed as $I_4=I_1+O_2+O_3+O_4$, whereby DCI 1100 includes 04 instead of the MCS index $I_4$ of PXSCH #4 1113. That is, $O_4$ is the MCS index $I_4$ of PXSCH #4 1113 minus the MCS index $I_3$ of PXSCH #3 1112. The MCS indices after PXSCH #2 1111 may be obtained by adding the MCS index $I_1$ of PXSCH #1 1110 to the difference of all MCS indices up to that PXSCH.

Figure 12:
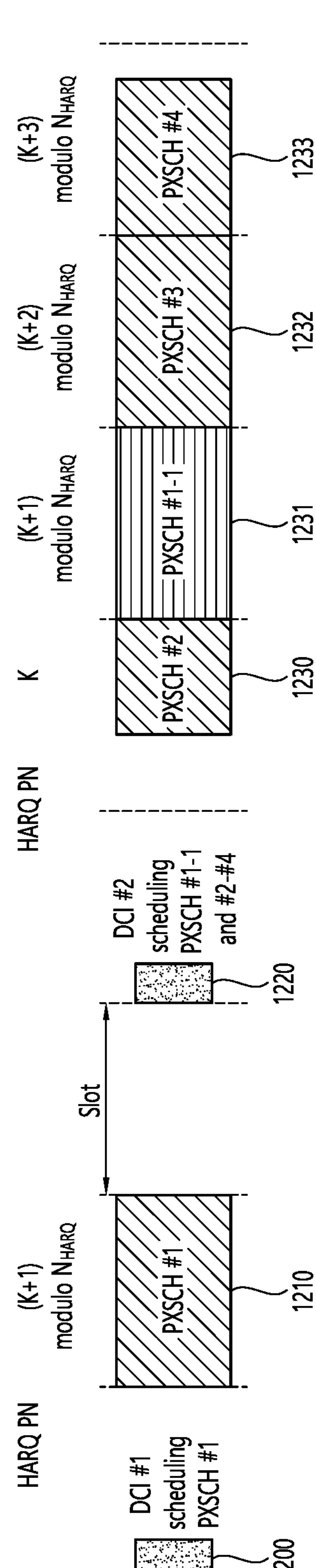
FIG. 12 shows an example where initial transmission PXSCHs and retransmission PXSCHs are scheduled with a single DCI, to which the first implementation of the present disclosure is applied.

FIG. 12 shows an example where initial transmission PXSCHs and retransmission PXSCHs are scheduled with a single DCI, to which the first implementation of the present disclosure is applied.

When there is at least one retransmission PXSCH among a plurality of PXSCHs scheduled with a single DCI, it may be difficult to arrange the PXSCHs in ascending order MCS indices for transmission as described in FIG. 11.

Referring to FIG. 12, a DCI #1 1200 is transmitted that schedules PXSCH #1 1210 corresponding to HARQ PN (K+1) modulo $N_{HARQ}$. In addition, a DCI #2 1220 is transmitted that schedules PXSCH #1-1 and PXSCH #2-#4. DCI #2 1220 schedules PXSCH #2 1230 corresponding to HARQ PN K, PXSCH #1-1 1231 corresponding to HARQ PN (K+1) modulo $N_{HARQ}$, PXSCH #3 1232 corresponding to HARQ PN (K+2) modulo $N_{HARQ}$, and PXSCH #4 1234 corresponding to HARQ PN (K+3) modulo $N_{HARQ}$.

PXSCH #1-1 1231 is retransmission PXSCH of PXSCH #1 1210. That is, PXSCH #1 1210 scheduled with DCI #1 1200 and transmitted is retransmitted as PXSCH #1-1 1231 scheduled with DCI #2 1220. PXSCH #2 1230, PXSCH #3 1232, and PXSCH #4 1233 are initial transmission PXSCHs that transmit new data, which can be transmitted in ascending order MCS indices depending on the QoS of the data to be transmitted. However, PXSCH #1-1 1231 is retransmission PXSCH of PXSCH #1 1210, which may be difficult to transmit in ascending order of MCS index with other PXSCHs. For example, the MCS index of PXSCH #1-1 1231 may be less than the MCS index of PXSCH #2 1230, or it may be greater than the MCS index of PXSCH #3 1232 or PXSCH #4 1233.

Figure 13:
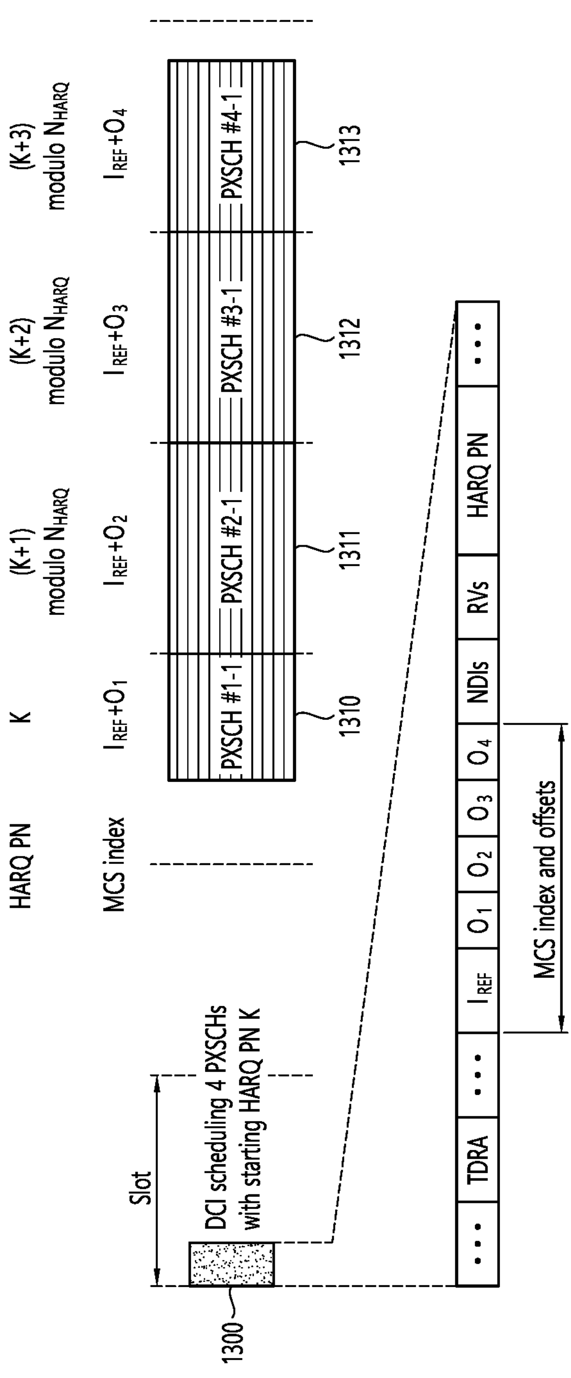
FIG. 13 shows an example of a method of delivering MCS information when scheduling only a plurality of retransmission PXSCHs with a single DCI, to which the first implementation of the present disclosure is applied.

FIG. 13 shows an example of a method of delivering MCS information when scheduling only a plurality of retransmission PXSCHs with a single DCI, to which the first implementation of the present disclosure is applied.

As described in FIG. 12, when two or more PXSCHs are retransmitted, the MCS indices between the retransmission PXSCHs may not be sorted in ascending order. Therefore, the MCS index of the retransmission PXSCH may be difficult to transmit by expressing the MCS index of the retransmission PXSCH as the difference between the MCS index of the immediately preceding PXSCH as described in FIG. 11. Therefore, in this case, the smallest value of the MCS index of the retransmission PXSCH may be considered as the reference MCS index, and the amount of MCS information that needs to be transmitted via the DCI may be reduced by transmitting the difference value of the MCS index of each PXSCH.

Referring to FIG. 13, a DCI 1300 is transmitted that schedules four PXSCHs starting with HARQ PN K. The DCI 1300 schedules PXSCH #1-1 1310 corresponding to HARQ PN K, PXSCH #2-1 1311 corresponding to HARQ PN (K+1) modulo $N_{HARQ}$, PXSCH #3-1 1312 corresponding to HARQ PN (K+2) modulo $N_{HARQ}$, and PXSCH #4-1 1313 corresponding to HARQ PN (K+3) modulo $N_{HARQ}$.

PXSCH #1-1 1310, PXSCH #2-1 1311, PXSCH #3-1 1312, and PXSCH #4-1 1313 all correspond to retransmission PXSCHs. The MCS indices of PXSCH #1-1 1310, PXSCH #2-1 1311, PXSCH #3-1 1312, and PXSCH #4-1 1313 may be represented by $I_1$, $I_2$, $I_3$, and $I_4$, respectively. However, the MCS indices of PXSCH #1-1 1310, PXSCH

#2-1 1311, PXSCH #3-1 1312, and PXSCH #4-1 1313 may not be sorted in ascending order.

The DCI 1300 includes a reference MCS index $I_{REF}$. $I_{REF}$ may be the smallest MCS index among $I_1$, $I_2$, $I_3$, and $I_4$. Alternatively, $I_{REF}$ may be the MCS index that has the smallest value among the MCS indices of other retransmission PXSCHs not represented in FIG. 13. Following the reference MCS index $I_{REF}$, the difference between the MCS index of each PXSCH and the reference MCS index $I_{REF}$ is included in the DCI 1300. Using the reference MCS index $I_{REF}$ and the difference between the MCS index of each PXSCH and the reference MCS index $I_{REF}$ transmitted via the DCI 1300, the UE may calculate the MCS index of each PXSCH.

For example, in FIG. 13, the DCI 1300 includes the reference MCS index $I_{REF}$. The MCS index $I_1$ of PXSCH #1-1 1310 may be expressed as $I_1=I_{REF}+O_1$, whereby the DCI 1300 includes $O_1$ instead of MCS index $I_1$ of PXSCH #1-1 1310. The MCS index $I_2$ of PXSCH #2-1 1311 may be expressed as $I_2=I_{REF}+O_2$, whereby the DCI 1300 includes $O_2$ instead of the MCS index $I_2$ of PXSCH #2-1 1311. The MCS index $I_3$ of PXSCH #3-1 1312 may be expressed as $I_3=I_{REF}+O_3$, whereby the DCI 1300 includes $O_3$ instead of the MCS index $I_3$ of PXSCH #3-1 1312. The MCS index $I_4$ of PXSCH #4-1 1313 may be expressed as $I_4=I_{REF}+O_4$, whereby the DCI 1300 includes $O_4$ instead of the MCS index $I_4$ of PXSCH #4-1 1313.

Figure 14:
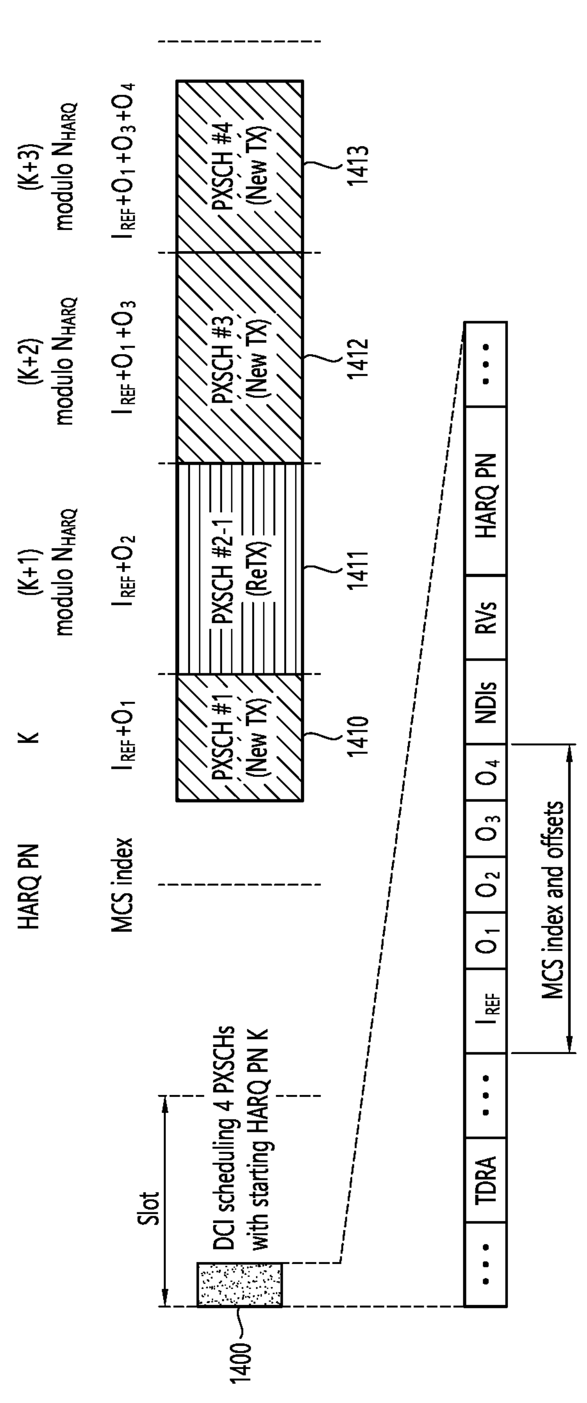
FIG. 14 shows an example of a method of delivering MCS information when scheduling initial transmission PXSCHs and retransmission PXSCHs with a single DCI, to which the first implementation of the present disclosure is applied.

FIG. 14 shows an example of a method of delivering MCS information when scheduling initial transmission PXSCHs and retransmission PXSCHs with a single DCI, to which the first implementation of the present disclosure is applied.

The initial transmission and retransmission PXSCHs may be scheduled together with a single DCI by delivering the difference between the reference MCS index IREF and the MCS index of each PXSCH via the DCI, and by differentiating the calculation method of the MCS index of the initial transmission PXSCH and the retransmission PXSCH. The MCS index of the initial transmission PXSCH may be added to the reference MCS index as the cumulative difference of all MCS indices up to that PXSCH, while the MCS index of the retransmission PXSCH may be added to the reference MCS index as the difference of only the MCS index corresponding to that PXSCH. In other words, FIG. 14 may be viewed as a combination of the method described in FIG. 11 and the method described in FIG. 13. The UE may distinguish the initial transmission PXSCH from the transmission PXSCH by the NDI carried over the DCI.

Referring to FIG. 14, a DCI 1400 is transmitted that schedules four PXSCHs starting with HARQ PN K. The DCI 1400 schedules PXSCH #1 1410 corresponding to HARQ PN K, PXSCHs #2-1 1411 corresponding to HARQ PN (K+1) modulo $N_{HARQ}$, PXSCH #3 1412 corresponding to HARQ PN (K+2) modulo $N_{HARQ}$, and PXSCH #4 1413 corresponding to HARQ PN (K+3) modulo $N_{HARQ}$.

PXSCH #1 1410, PXSCH #3 1412, and PXSCH #4 1413 correspond to the initial transmission PXSCHs. The MCS indices of PXSCH #1 1410, PXSCH #3 1412, and PXSCH #4 1413 may be represented by $I_1$, $I_3$, and $I_4$, respectively. The MCS indices of PXSCH #1 1410, PXSCH #3 1412, and PXSCH #4 1413 may be sorted in ascending order (i.e., $I_1 \leq I_3 < I_4$). On the other hand, PXSCH #2-1 1411 corresponds to a retransmission PXSCH. The MCS index of PXSCH #2-1 1411 may be represented by $I_2$. The MCS index of PXSCH #2-1 1411 may or may not be sorted in ascending order with other MCS indices. For example, it may be $I_2<I_1$, or $I_2>$I3 or $I_4$.

DCI 1400 includes a reference MCS index $I_{REF}$. $I_{REF}$ may be the smallest MCS index among $I_1$, $I_2$, $I_3$, and $I_4$. Alternatively, $I_{REF}$ may be the MCS index that has the smallest value among the MCS indices of all initial transmission PXSCHs and retransmission PXSCHs scheduled with the DCI 1400. Following the reference MCS index $I_{REF}$, the difference between the MCS index of each PXSCH and the reference MCS index $I_{REF}$ is included in the DCI 1400. Using the reference MCS index $I_{REF}$ and the difference between the MCS index of each PXSCH and the reference MCS index $I_{REF}$ transmitted via the DCI 1400, the UE may calculate the MCS index of each PXSCH.

For example, in FIG. 14, the DCI 1400 includes the reference MCS index $I_{REF}$. The MCS index $I_1$ of PXSCH #1 1410 may be expressed as $I_1=I_{REF}+O_1$, whereby the DCI 1400 includes $O_1$ instead of the MCS index $I_1$ of PXSCH #1 1410. Since PXSCH #2-1 1411 is a retransmission PXSCH, the MCS index $I_2$ of PXSCH #2-1 1411 may be represented as $I_2=I_{REF}+O_2$, whereby the DCI 1400 includes $O_2$ instead of the MCS index $I_2$ of PXSCH #2-1 1411. Since PXSCH #3 1412 is an initial transmission PXSCH, the MCS index $I_3$ of PXSCH #3 1412 may be represented as $I_3=I_{REF}+O_1+O_3$, whereby the DCI 1400 includes $O_3$ instead of the MCS index $I_3$ of PXSCH #3 1412. Since PXSCH #4 1413 is an initial transmission PXSCH, the MCS index $I_4$ of PXSCH #4 1413 may be represented as $I_4=I_{REF}+O_1+O_3+O_4$, whereby the DCI 1400 includes $O_4$ instead of the MCS index $I_4$ of PXSCH #4 1413.

Figure 15:
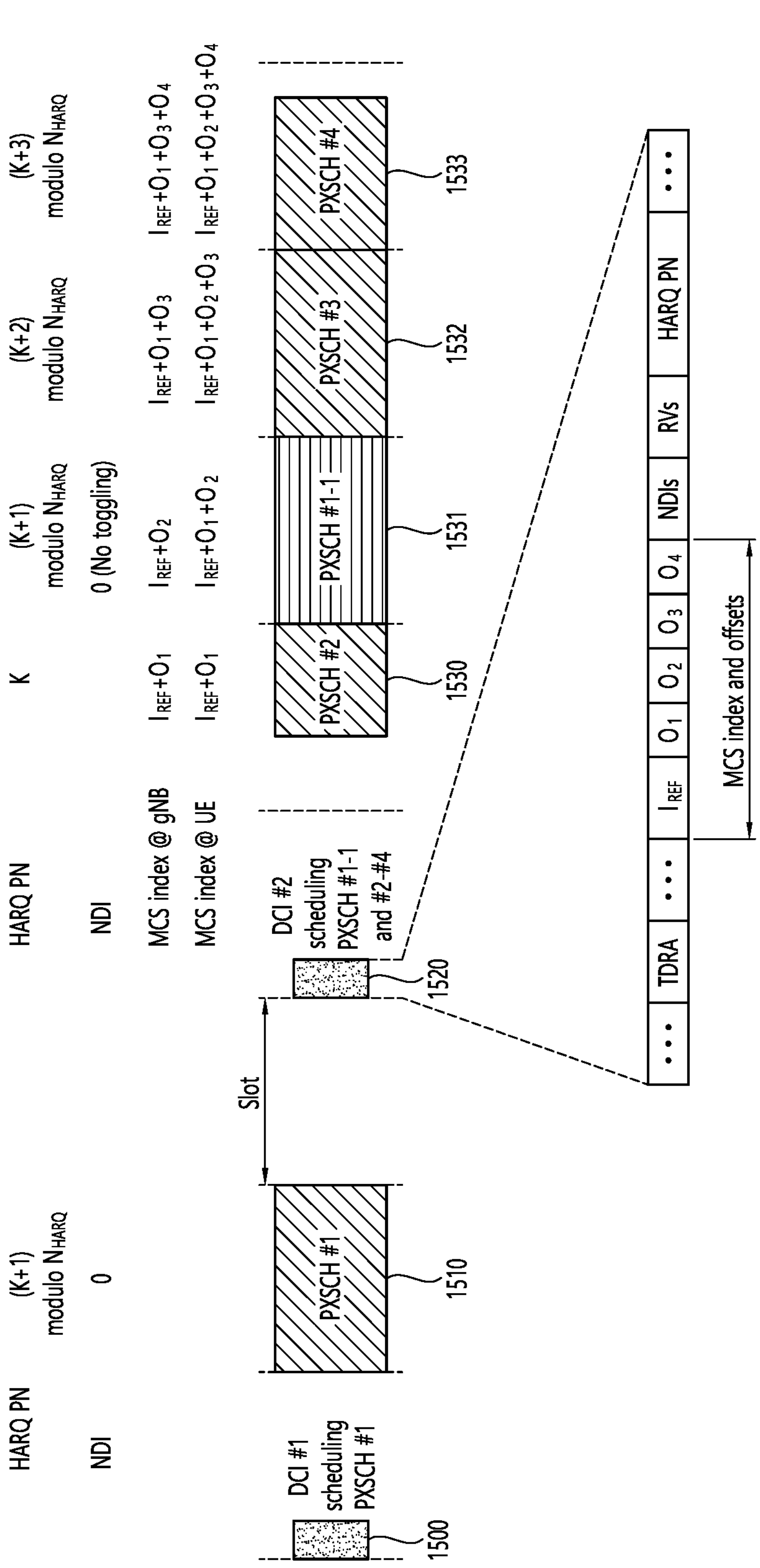
FIG. 15 shows an example of a UE miscalculating an MCS index when scheduling initial transmission PXSCHs and retransmission PXSCHs with a single DCI, to which the first implementation of the present disclosure is applied.

FIG. 15 shows an example of a UE miscalculating an MCS index when scheduling initial transmission PXSCHs and retransmission PXSCHs with a single DCI, to which the first implementation of the present disclosure is applied.

As described in FIG. 14, in order to calculate the MCS index of the initial transmission PXSCHs and the MCS index of the retransmission PXSCHs differently when scheduling the initial transmission PXSCHs and the retransmission PXSCHs with one DCI, the UE should be able to clearly distinguish between the initial transmission PXSCHs and the retransmission PXSCHs. In general, the initial transmission PXSCHs and retransmission PXSCHs may be distinguished by the NDI carried in the DCI. However, it is possible that the UE does not detect the DCI scheduling the initial transmission PXSCH and sends a Discontinuous Transmission (DTX), which the base station may mistakenly recognize as a Negative Acknowledgment (NACK) and perform a retransmission of the PXSCH. In this case, the UE may have difficulty accurately determining whether the retransmission PXSCH is actually an initial transmission PXSCH or a retransmission PXSCH, and consequently may incorrectly calculate the MCS index of that PXSCH.

Referring to FIG. 15, DCI #1 1500 is transmitted that schedules PXSCH #1 1510 corresponding to HARQ PN (K+1) modulo $N_{HARQ}$. The NDI corresponding to PXSCH #1 1510 is 0. However, the UE does not receive DCI #1 1500, and therefore the UE does not transmit a HARQ-ACK and/or transmits a DTX.

In addition, DCI #2 1520 is transmitted that schedules PXSCH #1-1 and PXSCH #2-#4. DCI #2 1520 schedules PXSCH #2 1530 corresponding to HARQ PN K, PXSCH #1-1 1531 corresponding to HARQ PN (K+1) modulo $N_{HARQ}$, PXSCH #3 1532 corresponding to HARQ PN (K+2) modulo $N_{HARQ}$, and PXSCH #4 1533 corresponding to HARQ PN (K+3) modulo $N_{HARQ}$.

PXSCH #1-1 1531 is a retransmission PXSCH of PXSCH #1 1510. That is, PXSCH #1 1510 scheduled with DCI #1 1500 and transmitted is retransmitted as PXSCH #1-1 1531 scheduled with DCI #2 1520. This is because the base station mistakenly recognized the DTX as a NACK. The NDI corresponding to PXSCH #1-1 1531 is 0, which is the same as the NDI corresponding to PXSCH #1 1510. Since the NDI is not toggled, this implies a retransmission. PXSCH #2 1530, PXSCH #3 1532, and PXSCH #4 1533 are initial transmission PXSCHs that transmit new data.

That is, although the base station transmitted PXSCH #1-1 1531 as a retransmission PXSCH, the UE may determine that PXSCH #1-1 1531 is an initial transmission PXSCH. As a result, an error may occur when the UE calculates the MCS index of the PXSCH starting from PXSCH #1-1 1531.

For example, in FIG. 15, the DCI 1520 includes a reference MCS index $I_{REF}$ and difference values $O_1$, $O_2$, $O_3$, and $O_4$ from the MCS index of each PXSCH. Since the base station considers PXSCH #1-1 1531 as a retransmission PXSCH, the difference values $O_1$, $O_2$, $O_3$, and $O_4$ included in the DCI 1520 means that the MCS indices $I_1$, $I_2$, $I_3$, and $I_4$ of PXSCH #2 1530, PXSCH #1-1 1531, PXSCH #3 1532, and PXSCH #4 1533 are calculated as $I_1=I_{REF}+O_1$, $I_2=I_{REF}+O_2$, $I_3=I_{REF}+O_1+O_3$, and $I_4=I_{REF}+O_1+O_3+O_4$, respectively. However, since the UE considers PXSCH #1-1 1531 as an initial transmission PXSCH, the UE uses the reference MCS index $I_{REF}$ and the difference values $O_1$, $O_2$, $O_3$, and $O_4$ included in the DCI 1520 to calculate the MCS indices $I_1$, $I_2$, $I_3$, and $I_4$ of PXSCH #2 1530, PXSCH #1-1 1531, PXSCH #3 1532, and PXSCH #4 1533 as $I_1=I_{REF}+O_1$, $I_2=I_{REF}+O_1+O_2$, $I_3=I_{REF}+O_1+O_2+O_3$, and $I_4=I_{REF}+O_1+O_2+O_3+O_4$, respectively. This means that the MCS calculations between the base station and the UE do not match.

FIG. 16 shows an example of a UE accurately calculating an MCS index using a sorted transmission indicator bitmap when scheduling initial transmission PXSCHs and retransmission PXSCHs with a single DCI, to which the first implementation of the present disclosure is applied.

To address the problem described in FIG. 15, the DCI that schedules the initial transmission PXSCHs and/or the retransmission PXSCHs may include a Sorted Transmission Indicator (STI) bitmap that indicates whether each PXSCH is sorted in ascending order of MCS index, starting from the reference MCS index. The length of the STI bitmap may be equal to the number of PXSCHs scheduled by the DCI.

For example, if the reference MCS index is $I_{REF}$, the STI of the n-th (>0 integer) PXSCH is $S_n$ (0 or 1), and the difference of the MCS index of the n-th PXSCH is $O_n$ (≥0 integer), then the MCS index In of the n-th PXSCH may be calculated by Equation 1 and Equation 2. Equation 1 may represent the case where $S_n=0$ of the n-th PXSCH, and Equation 2 may represent the case where $S_n=1$ of the n-th PXSCH. $S_n=0$ may represent a retransmission, and $S_n=1$ may represent an initial transmission.

$$I_n = I_{REF} + O_n \quad \text{[Formula 1]}$$

$$I_n = I_{REF} + \sum_{i=1}^{n} S_i O_i \quad \text{[Equation 2]}$$

However, it is not always necessary to set $S_n=0$ for retransmission and $S_n=1$ for initial transmission. Even for retransmission, $S_n=1$ may be set if the MCS indices of PXSCHs are sorted in ascending order. Even for initial transmission, $S_n=0$ may be set to ensure that the MCS index is calculated only as the difference between the reference MCS index and the MCS index of the corresponding PXSCH.

Referring to FIG. 16, DCI #1 1600 is transmitted that schedules PXSCH #1 1610 corresponding to HARQ PN (K+1) modulo $N_{HARQ}$. The NDI corresponding to PXSCH #1 1610 is 0. However, the UE does not receive DCI #1 1600, and therefore the UE does not transmit a HARQ-ACK and/or transmits a DTX.

In addition, DCI #2 1620 is transmitted that schedules PXSCH #1-1 and PXSCH #2-#4. DCI #2 1620 schedules PXSCH #2 1630 corresponding to HARQ PN K, PXSCH #1-1 1631 corresponding to HARQ PN (K+1) modulo $N_{HARQ}$, PXSCH #3 1632 corresponding to HARQ PN (K+2) modulo $N_{HARQ}$, and PXSCH #4 1633 corresponding to HARQ PN (K+3) modulo $N_{HARQ}$.

PXSCH #1-1 1631 is a retransmission PXSCH of PXSCH #1 1610. That is, PXSCH #1 1610 scheduled with DCI #1 1600 and transmitted is retransmitted as PXSCH #1-1 1631 scheduled with DCI #2 1620. This is because the base station mistakenly recognized the DTX as a NACK. The NDI corresponding to PXSCH #1-1 1631 is NDI=0, which is the same as the NDI corresponding to PXSCH #1 1610. Since the NDI is not toggled, this implies a retransmission. PXSCH #2 1630, PXSCH #3 1632, and PXSCH #4 1633 are the initial transmission PXSCHs that send the new data.

DCI #2 1620 further includes an STI bitmap. In FIG. 16, the STI bitmap is "1011". This may mean that the STIs of PXSCH #2 1630, PXSCH #1-1 1631, PXSCH #3 1632, and PXSCH #4 1633 scheduled by DCI #2 1620 are 1, 0, 1, and 1, respectively, which may mean that PXSCH #2 1630, PXSCH #3 1632, and PXSCH #4 1633 are sorted transmission PXSCHs, and PXSCH #1-1 1631 is an unsorted transmission PXSCH.

Although the base station transmitted PXSCH #1-1 1631 as a retransmission PXSCH, the UE may determine that PXSCH #1-1 1631 is an initial transmission PXSCH. However, the UE can correctly calculate the MCS index by calculating the MCS index of each PXSCH using the STI bitmap included in DCI #2 1620. The UE may calculate the MCS index of each PXSCH using Equation 1 and Equation 2 described above, which is consistent with the MCS index of each PXSCH calculated by the base station.

Figure 17:
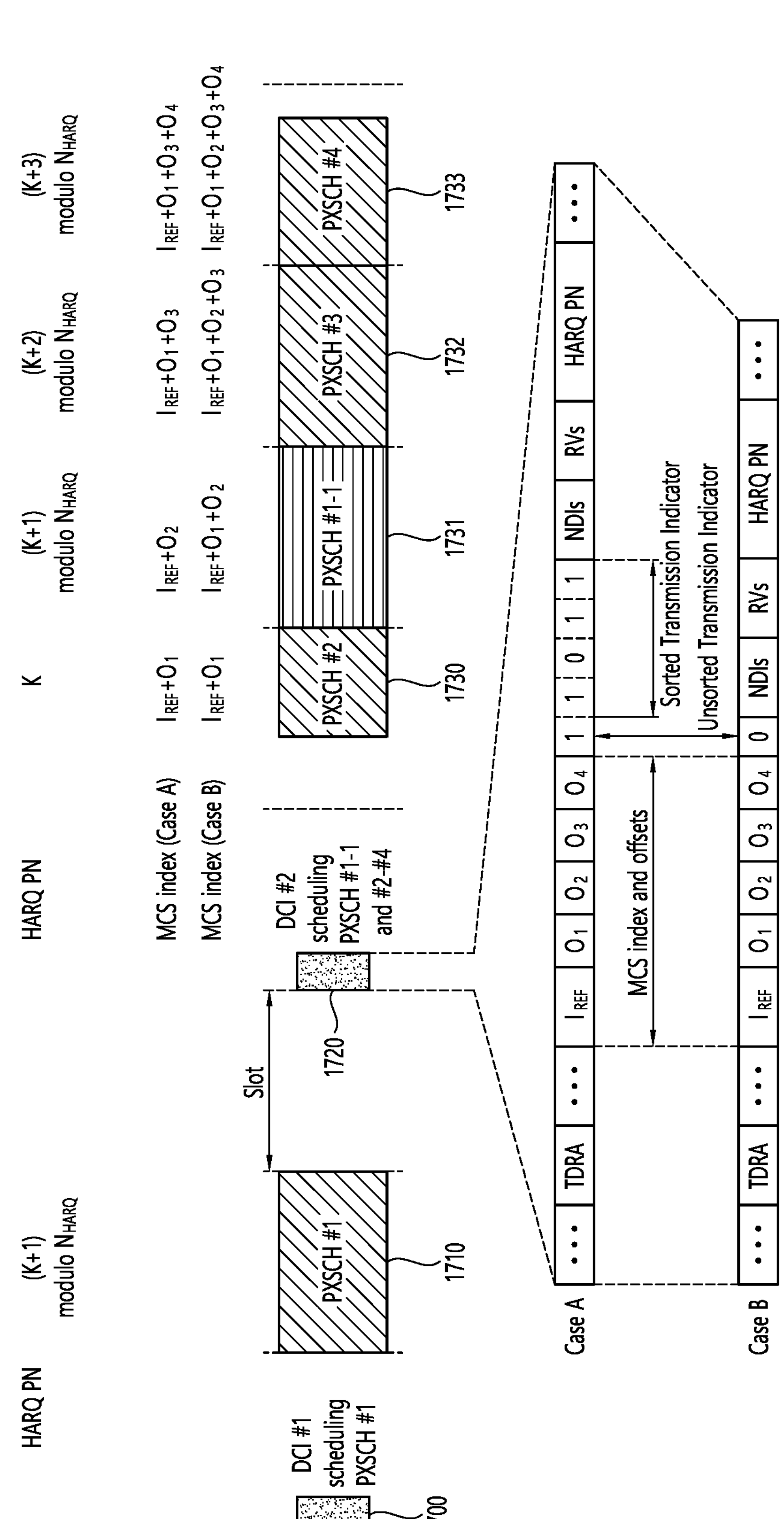
FIG. 17 shows an example of a method of delivering MCS information using an unsorted transmission indicator, to which the first implementation of the present disclosure is applied.

FIG. 17 shows an example of a method of delivering MCS information using an unsorted transmission indicator, to which the first implementation of the present disclosure is applied.

As described in FIG. 16, sending the STI bitmap together over DCI may solve the problem of misaligned calculation of the MCS index between the base station and UE, but since as many bits are required as there are PXSCHs, it may be inefficient to send the STI bitmap over DCI when all PXSCHs are sorted in ascending order of the MCS index (e.g., when $S_n=1$ for all PXSCHs). In many cases, the STI bitmap may be unnecessary, especially if the target BLER is low, resulting in a low retransmission probability. Therefore, an Unsorted Transmission Indicator (UTI) may be added to the DCI to indicate whether there is an unsorted transmission or not.

For example, UTI=1 may indicate the presence of PXSCHs that are not sorted in ascending order of the MCS index. In this case, the DCI may include an STI bitmap. On the other hand, UTI=0 may indicate that there are no PXSCHs that are not sorted in ascending order of the MCS index. That is, all PXSCHs are sorted in ascending order of the MCS index, in which case the DCI does not need to include an STI bitmap. If UTI=0, the UE may assume that all PXSCHs are transmitted sorted in ascending order of MCS index and calculate the MCS index of each PXSCH.

Referring to FIG. 17, in Case A, the DCI includes UTI=1. This means that there are PXSCHs that are not sorted in ascending order of the MCS index, so the DCI additionally includes the STI bitmap. The UE may use Equation 1 and Equation 2 described above to calculate the MCS index of each PXSCH.

On the other hand, in Case B, the DCI includes UTI=0. This means that there are no PXSCHs that are not sorted in ascending order of the MCS index, i.e., all PXSCHs are sorted in ascending order of the MCS index. Therefore, the DCI does not include the STI bitmap, which prevents the DCI from growing in size. The UE may assume that all PXSCHs are transmitted sorted in ascending order of the MCS index and calculate the MCS index of each PXSCH. For example, the UE may calculate the MCS index of each PXSCH using the method described with reference to FIG. 11. In this case, the reference MCS index $I_{REF}$ in FIG. 17 may correspond to the MCS index $I_1$ of the first PXSCH in FIG. 11, and the MCS index difference value $O_1$ of the first PXSCH in FIG. 17 may not be transmitted.

Meanwhile, depending on the QoS characteristics of the data stream, it may or may not be efficient to use UTI. For example, it may be desirable not to use UTI if the STI bitmap should be included in most cases. The base station may select/configure the optimal DCI transmission method by enabling or disabling UTI by e.g., RRC messages, etc. If UTI is disabled, the DCI may always include an STI bitmap, as described in FIG. 16. If UTI is enabled, the value of UTI may determine whether the STI bitmap is transmitted or not, as described in FIG. 17.

2. Second Implementation

A second implementation of the present disclosure provides a method for efficiently allocating a limited number of bits of a DCI between sorted transmissions and unsorted transmissions.

The MCS index may include both modulation order and code rate information, or it may include only modulation order. For example, if the NR supports Binary Phase Shift Keying (BPSK), Quadrature Phase Shift Keying (QPSK), 16QAM, and 64QAM as modulation orders, MCS indices 0 through 27 include both modulation order and code rate information, which may be used for both initial transmission and retransmission. MCS indices 28-31, on the other hand, include only modulation order information, which may only be used for retransmission. This is described in Table 5 above. Depending on whether the reference MCS index $I_{REF}$ is one of these two types, the range of the difference between the MCS index of each PXSCH and the reference MCS index $I_{REF}$ may vary. If the reference MCS index includes both modulation order and encoding rate information (e.g., MCS index 0 to 27), the range of variation in the difference value may be relatively large. On the other hand, if the reference MCS index includes only modulation order information (e.g., MCS index 28-31), the range of variation in the difference value may be relatively small.

Also, the range of the difference between the MCS index of sorted transmissions and the MCS index of unsorted transmissions may be different. Because the MCS index of sorted transmissions is transmitted only as the difference from the MCS index of the immediately preceding transmission, the range of the difference may be relatively small. On the other hand, the MCS index of unsorted transmissions is transmitted as the difference from the reference MCS index, not the MCS index of the immediately preceding transmission, so the range of difference values may be relatively large. In other words, in sorted transmissions, the change in the total MCS index is the difference between the MCS index of the last PXSCH and the reference MCS index, which is equal to the accumulation of the MCS index difference values of each PXSCH. In contrast, in unsorted transmissions, the change in the MCS index is likely to be similar to the total MCS index change in the initial transmission. In addition, in sorted transmissions, because data with the same MCS may be divided into multiple PXSCHs and transmitted, the amount of change in the MCS index is likely to be less than the accumulation of the maximum value that each difference value may have. Therefore, it may be efficient to allocate the number of bits required to transfer the MCS index difference value differently for sorted and unsorted transmissions.

If the number of bits required to transmit MCS index difference values are allocated differently for sorted and unsorted transmissions, the number of bits required may vary significantly depending on the number of sorted and unsorted transmissions. If the number of bits required to transmit MCS index difference values is variable, the size of the DCI may be fixed based on the largest case or variable. In the former case, the DCI size may be excessively large, and in the latter case, the UE may need to perform decoding for all possible DCI sizes, which increases the complexity and power consumption of the UE. Therefore, there is a need for a method for appropriately allocating and utilizing the limited size of DCI bits based on the number of sorted and unsorted transmissions.

Figure 18:
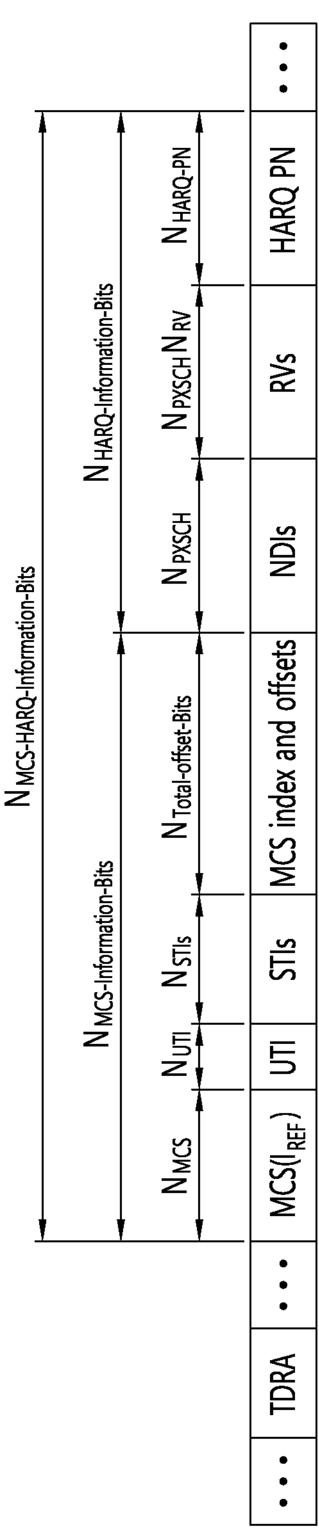
FIG. 18 shows an example of a DCI for multiple TTI scheduling to which the second implementation of the present disclosure is applied.

FIG. 18 shows an example of a DCI for multiple TTI scheduling to which the second implementation of the present disclosure is applied.

FIG. 18 shows an example of constructing a DCI that includes MCS and HARQ information in multiple TTI scheduling. When the number of PXSCHs determined by the TDRA is NPXSCH, the size of each piece of information included in the DCI may be configured as follows.

(1) MCS Information

- MCS ($I_{REF}$): Indicates the reference MCS index. The number of bits for $I_{REF}$, $N_{MCS}$, may be determined by the size of the MCS table. For example, in NR, $N_{MCS}$ may be 5.
- UTI: Unsorted Transmission Indicator, where the number of bits for the UTI, $N_{UTI}$, is 0 if UTI is disabled and 1 if it is enabled.
- STI: Sorted Transmission indicator, where the total number of bits for the STI, $N_{STIs}$, is 0 if UTI is enabled and its value is 0 (i.e., UTI is enabled but there are no unsorted transmissions) and NPXSCH otherwise.
- MCS Index Offset: The difference between the MCS index of each PXSCH and the reference MCS index $I_{REF}$, consisting of NPXSCH differences. The number of bits of the MCS index offset, $N_{Total\text{-}Offset\text{-}Bits}$, may be expressed as Equation 3.

$$N_{Total-Offset-Bits} = N_{MCS-Information-Bits} - (N_{MCS} + N_{UTI} + N_{STIs}) \quad \text{[Equation 3]}$$

In other words, the number of bits of MCS index offset $N_{Total\text{-}Offset\text{-}Bits}$ is the total number of MCS information bits minus the number of bits of MCS ($I_{REF}$), UTI, and STI.

(2) HARQ information

- HARQ PN: HARQ process number of the first PXSCH, the number of bits $N_{HARQ\text{-}PN}$ is determined by the number of HARQ processes in operation. For example, in NR, $N_{HARQ\text{-}PN}$ may be 4.

NDI: NDI for each PXSCH, consisting of $N_{PXSCH}$ bits.

RVs: RV for each PXSCH, consisting of $N_{PXSCH}N_{RV}$ bits when the number of bits for the RV is the $N_{RV}$.

When the number of bits required to transmit MCS information and HARQ information, $N_{MCS\text{-}HARQ\text{-}Information\text{-}Bits}$, is fixed so that the UE can decode a DCI with one size (i.e., DCI size fixed), the number of bits of the MCS index offset, $N_{Total\text{-}Offset\text{-}Bits}$, may be expressed as Equation 4.

$$N_{Total-Offset-Bits} = N_{MCS-HARQ-Information-Bits} - (N_{MCS} + N_{UTI} + N_{STIs}) - (N_{HARQ-PN} + N_{PXSCH}(1 + N_{RV})). \quad \text{[Equation 4]}$$

At this time, the following two methods may be considered as a way to differentially allocate the total number of bits of the MCS index offset $N_{Total\text{-}Offset\text{-}Bits}$ to the sorted transmissions (hereinafter referred to as Type-1) and the unsorted transmissions (hereinafter referred to as Type-2).

(1) First Method

In the first method, the number of bits for each offset value of the sorted transmissions $N_{Type\text{-}1\text{-}Offset\text{-}Bits}$ and the number of bits for each offset value of the unsorted transmissions $N_{Type\text{-}2\text{-}Offset\text{-}Bits}$ may be set to a fixed value. The base station may schedule such that the sum of the total number of bits of MCS index offsets does not exceed $N_{Total\text{-}Offset\text{-}Bits}$. The base station may inform the UE of the fixed and set $N_{Type\text{-}1\text{-}Offset\text{-}Bits}$ and $N_{Type\text{-}2\text{-}Offset\text{-}Bits}$ via e.g., RRC messages.

The base station may determine the $N_{PXSCH}$ and $N_{Type\text{-}1}$ and $N_{Type\text{-}2}$ to satisfy Equation 5, where the number of sorted transmission PXSCHs is called $N_{Type\text{-}1}$ and the number of unsorted transmission PXSCHs is called $N_{Type\text{-}2}$.

$$\begin{aligned} N_{Total-Offset-Bits} &\geq N_{Type-1}N_{Type-1-Offset-Bits} + N_{Type-2}N_{Type-2-Offset-Bits} = N_{Type-1}N_{Type-1-Offset-Bits} + (N_{PXSCH} - N_{Type-1})N_{Type-2-Offset-Bits} = \\ &(N_{PXSCH} - N_{Type-2})N_{Type-1-Offset-Bits} + N_{Type-2}N_{Type-2-Offset-Bits} \end{aligned} \quad \text{[Equation 5]}$$

(2) Method 2

In the second method, $N_{Type\text{-}1\text{-}Offset\text{-}Bits}$ and $N_{Type\text{-}2\text{-}Offset\text{-}Bits}$ may be dynamically determined by $N_{PXSCH}$ and $N_{Type\text{-}1}$ and $N_{Type\text{-}2}$.

The relationship between $N_{Type\text{-}1\text{-}Offset\text{-}Bits}$ and $N_{Type\text{-}2\text{-}Offset\text{-}Bits}$ may be expressed by Equation 6. In Equation 6, a is a value greater than 0, which may represent a proportional constant of the cumulative maximum value of the sorted transmission difference value and the maximum value of the unsorted transmission difference value. The value of a may be communicated by the base station to the UE via e.g., RRC messages.

$$2^{N_{Type-2-Offset-Bits}} - 1 = \alpha N_{Type-1}\left(2^{N_{Type-1-Offset-Bits}} - 1\right) \quad \text{[Formula 6]}$$

$N_{Type\text{-}1\text{-}Offset\text{-}Bits}$ with a value of at least one bit from Equation 6 may be represented by Equation 7.

$$N_{Type-1-Offset-Bits} = \max\left(1, \log_2\left(1 + \frac{2^{N_{Type-2-Offset-Bits}} - 1}{\alpha N_{Type-1}}\right)\right) \quad \text{[Equation 7]}$$

The relationship between $N_{Total\text{-}Offset\text{-}Bits}$, $N_{Type\text{-}1}$ and $N_{Type\text{-}1\text{-}Offset\text{-}Bits}$, and $N_{Type\text{-}2}$ and $N_{Type\text{-}2\text{-}Offset\text{-}Bits}$ may be represented by Equation 8.

$$\begin{aligned} N_{Total-Offset-Bits} &\geq N_{Type-1}N_{Type-1-Offset-Bits} + N_{Type-2}N_{Type-2-Offset-Bits} = \\ &N_{Type-1}\max\left(1, \log_2\left(1 + \frac{2^{N_{Type-2-Offset-Bits}} - 1}{\alpha N_{Type-1}}\right)\right) + N_{Type-2}N_{Type-2-Offset-Bits} \end{aligned} \quad \text{[Equation 8]}$$

$N_{Type\text{-}2\text{-}Offset\text{-}Bits}$ is the largest integer that satisfies Equation 8. The number of bits of the difference value assigned to $N_{type\text{-}1}$ PXSCHs, $N_{Type\text{-}1}$-Total-Offset-Bits, may be calculated by Equation 9.

$$N_{Type-1-Total-Offset-Bits} = N_{Total-Offset-Bits} - N_{Type-2}N_{Type-2-Offset-Bits} \quad \text{[Equation 9]}$$

$N_{Type\text{-}1\text{-}Total\text{-}Offset\text{-}Bits}$ may be assigned to each sorted transmission PXSCH as shown in Equations 10 through 13. Since the number of bits assigned to each PXSCH is an integer, it may not be possible to assign the same number of bits to all PXSCHs. Some ($N_{Type\text{-}1\text{-}1}$) PXSCHs may be allocated one more bit than the rest ($N_{Type\text{-}1\text{-}2}$) PXSCHs.

$$N_{Type-1-1} = \mathrm{mod}(N_{Type-1-Total-Offset-Bits}, N_{Type-1}) \quad \text{[Formula 10]}$$

$$N_{Type-1-2} = N_{Type-1} - N_{Type-1-1} \quad \text{[Formula 11]}$$

$$N_{Type-1-1-Bits} = \left\lceil \frac{N_{type-1-Total-Offset-Bits}}{N_{Type-1}} \right\rceil \quad \text{[Formula 12]}$$

$$N_{Type-1-2-Bits} = \left\lfloor \frac{N_{type-1-Total-Offset-Bits}}{N_{Type-1}} \right\rfloor \quad \text{[Formula 13]}$$

Additionally, depending on the characteristics of the service and data stream, the first transmitted PXSCH from among the sorted transmission PXSCHs may be prioritized and allocated one more bit. Alternatively, the later transmitted PXSCH may be prioritized and allocated one more bit. For example, if the transmission volume of a data stream requiring a similarly low MCS is greater than the transmission volume of a data stream requiring a higher MCS, it may be efficient to prioritize one more bit for the later transmitted PXSCH because it is more likely to be followed by a larger MCS index difference. If the earlier transmitted PXSCH is prioritized by one more bit, then Type-1-1 in Equation 10 is the earlier transmitted PXSCH and Type-1-2 in Equation 11 is the later transmitted PXSCH. Conversely, if one more bit is prioritized for the later transmitted PXSCH, then Type-1-2 in Equation 11 is the earlier transmitted PXSCH and Type-1-1 in Equation 10 is the later transmitted PXSCH. The base station may set whether the earlier transmitted PXSCH or the later transmitted PXSCH is allocated one more bit in priority via, e.g., an RRC message.

The maximum value of the MCS index difference value is determined by the number of bits, which may be less than the difference value of the MCS index to be transmitted. If the difference value of the MCS index to be transmitted is larger than the maximum value of the MCS index difference value that can be transmitted to the DCI, the base station may set the MCS index difference value to be transmitted via the DCI to the maximum value that can be transmitted. In this case, the actual MCS index transmitted will be lower than the MCS index that should be transmitted, which may reduce the transmission efficiency somewhat, but it will still satisfy the QoS required for the data stream.

If the reference MCS index transmitted via the DCI is $I_{REF}$, the MCS index required for the n-th $P_{XSCH}$ is $I_{REQ,n}$, the sorted transmission indicator of the n-th $P_{XSCH}$ is $S_n$ (0 or 1), and the maximum value of the MCS index difference value of the n-th $P_{XSCH}$ which can be transmitted via the DCI is $O_{MAX,n}$ (>0), the base station may transmit the MCS index $O_n$ (≥0) of the n-th $P_{XSCH}$ as follows.

(1) If the reference MCS index includes both modulation order and coding rate information (e.g., MCS index 0 to 27), $O_n$ (an integer ≥0) may be calculated by Equation 14 and Equation 15. Equation 14 may represent the case where $S_n$=0 of the n-th $P_{XSCH}$, and Equation 15 may represent the case where $S_n$=1 of the n-th $P_{XSCH}$. $S_n$=0 may represent unsorted transmissions, and $S_n$=1 may represent sorted transmissions.

$$O_n = \min(O_{MAX,n}, I_{REQ,n} - I_{REF}) \quad \text{[Formula 14]}$$

$$O_n = \min\left(O_{MAX,n}, I_{REQ,n} - \left(I_{REf} + \sum_{i=1}^{n-1} S_i O_i\right)\right) \quad \text{[Equation 15]}$$

(2) When the reference MCS index includes only modulation order information, $O_n$ (an integer ≥0) may be calculated by Equation 14.

According to the first and second implementations of the present disclosure, the MCI information included in the DCI in multiple TTI scheduling may be organized as follows.

- MCS ($I_{REF}$): Indicates the reference MCS index. The number of bits for $I_{REF}$, $N_{MCS}$, may be determined by the size of the MCS table. For example, in NR, $N_{MCS}$ may be 5.
- UTI: Unsorted Transmission Indicator, the number of bits for the UTI, $N_{UTI}$, is 0 if UTI is disabled and 1 if it is enabled.
- STI: Sorted Transmission Indicator, the number of bits in the total STI, $N_{STIs}$, is 0 if UTI is enabled and its value is 0 (i.e., UTI is enabled but there are no unsorted transmissions) and $N_{PXSCH}$ otherwise. The $N_{PXSCH}$ may be obtained from the TDRA.
- MCS index offset for each PXSCH: The remaining DCI bits by subtracting the number of bits of the reference MCS index, the number of bits of the UTI, and the number of bits of the STI for each PXSCH from the total number of bits of MCS information are allocated to each PXSCH.

In addition, according to the first and second implementations of the present disclosure, the following information may be configured for multiple TTI scheduling. The information may be specified by the specification or may be communicated from the base station to the UE via e.g., RRC messages.

- A total number of DCI bits to transmit MCS and HARQ information $N_{MCS\text{-}HARQ\text{-}Information\text{-}Bits}$
- Whether UTI is used
- A method for determining the number of bits for the MCS index difference value for sorted transmission and unsorted transmission PXSCHs: Method 1 or 2
- If Method 1 is used to determine the number of bits for the MCS index difference value for sorted transmission and unsorted transmission PXSCHs: Number of bits for the sorted transmission MCS index difference value $N_{Type\text{-}1\text{-}Offset\text{-}Bits}$ and number of bits for the unsorted transmission MCS index difference value $N_{Type\text{-}2\text{-}Offset\text{-}Bits}$
- If Method 2 is used to determine the number of bits for the MCS index difference value for sorted transmission and unsorted transmission PXSCHs: a (proportional constant of the maximum cumulative MCS index difference value of the sorted transmission PXSCH and the maximum value of the MCS index difference value of the unsorted transmission PXSCH if the reference MCS index contains both modulation order and coding rate information) and the bit allocation priority of the sorted transmission PXSCH (indicates whether the PXSCH transmitted first or later has higher priority).

Figure 19:
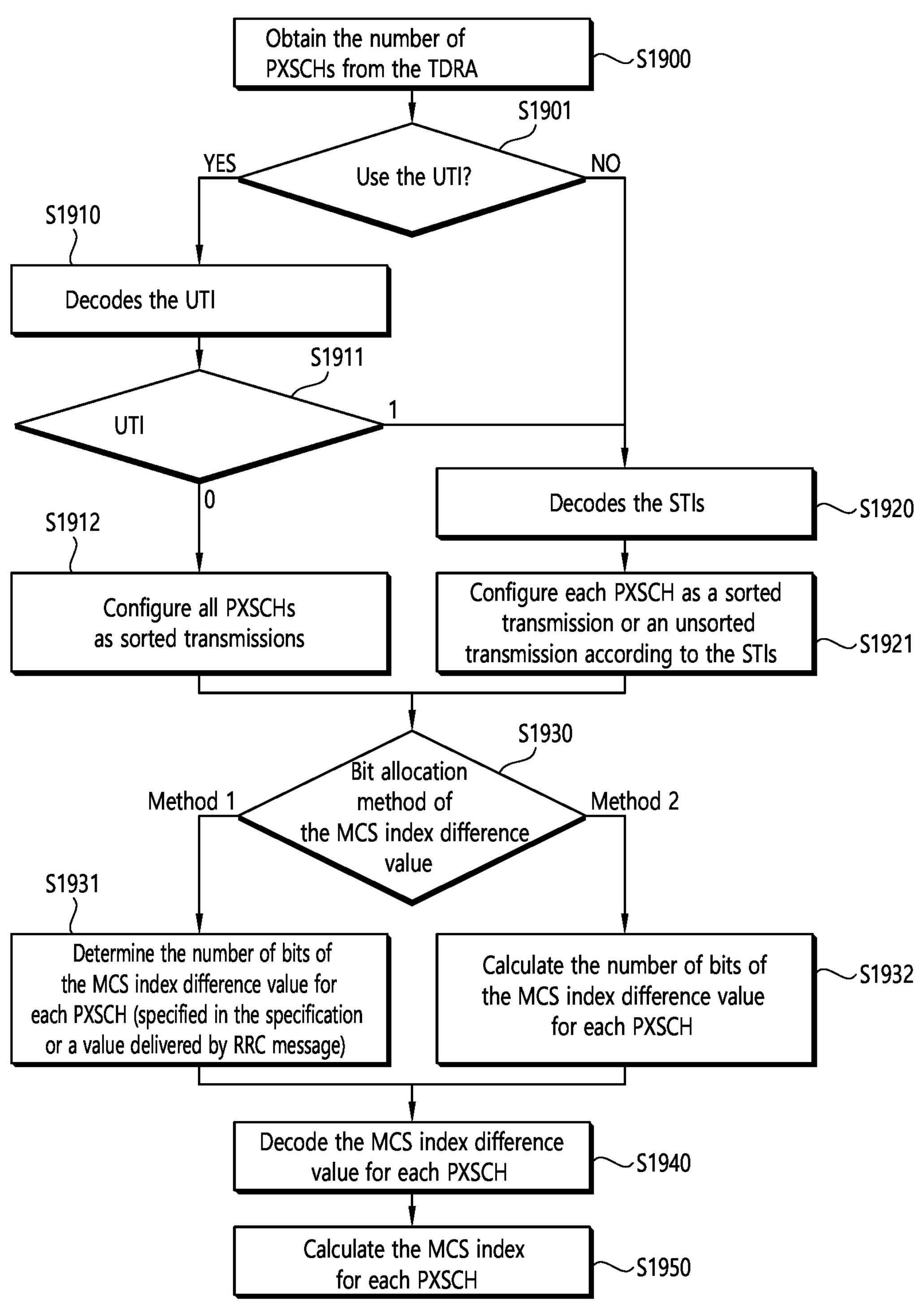
FIG. 19 shows an example of a procedure for obtaining an MCS index of each PXSCH from a DCI received by a UE, to which implementations of the present disclosure are applied.

FIG. 19 shows an example of a procedure for obtaining an MCS index of each PXSCH from a DCI received by a UE, to which implementations of the present disclosure are applied.

In step S1900, the UE obtains NPXSCH, the number of PXSCHs, from the TDRA included in the DCI.

In step S1901, the UE determines whether the DCI includes a UTI.

If the DCI includes a UTI, in step S1910, the UE decodes the UTI.

In step S1911, the UE checks whether the value of the UTI is 1 or 0.

If UTI=0, in step S1912, the UE configures/considers that all PXSCH transmissions are sorted transmissions.

If UTI=1 and/or the DCI does not include a UTI, in step S1920, the UE decodes the STI bitmap.

In step S1921, the UE configures/considers each PXSCH as a sorted transmission or an unsorted transmission based on the STI of each PXSCH.

In step S1930, the UE determines whether the bit allocation method of the MCS index difference value is method 1 or method 2 as described above.

If the bit allocation method of the MCS index difference value is method 1, in step S1931, the UE determines the number of bits of the MCS index difference value for each PXSCH. The number of bits of the MCS index difference value for each PXSCH may be specified in the specification or may be configured, e.g., in an RRC message transmitted by the base station.

If the bit allocation method of the MCS index difference value is method 2, in step S1932, the UE calculates the number of bits of the MCS index difference value for each PXSCH.

In step S1940, the UE decodes the MCS index difference value for each PXSCH.

In step S1950, the UE calculates the MCS index for each PXSCH.

The present disclosure can have various advantageous effects.

For example, in multiple TTI scheduling, where multiple PXSCHs are scheduled with a single DCI, data can be transmitted using different MCSs for each PXSCH while minimizing the increase in size of the DCI.

For example, when multiple data streams with different target BLERs are scheduled with one DCI and transmitted, the frequency transmission efficiency can be increased and the power consumption of the UE can be lowered while satisfying the data stream-specific QoS.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

performing, by a User Equipment (UE), an initial access with a network;

receiving, by the UE, one downlink control information from the network over a downlink control channel, wherein the one downlink control information schedules a first shared channel, a second shared channel, and a third shared channel, and wherein the one downlink control information comprises a reference Modulation and Coding Scheme (MCS) index, a first offset value for the reference MCS index, and a second offset value for the reference MCS index;

communicating, by the UE, with the network over the first shared channel to which a first MCS index is applied, wherein the first MCS index is based on the reference MCS index; and after communicating with the network over the first shared channel:

i) communicating, by the UE, with the network over the second shared channel to which a second MCS index greater than the first MCS index is applied, wherein the second MCS index is based on the reference MCS index and the first offset value; and ii) communicating, by the UE, with the network over the third shared channel to which a third MCS index greater than the first MCS index is applied.

2. The method of claim 1, wherein the first MCS index is same as the reference MCS index, and wherein the second MCS index is equal to the reference MCS index plus the first offset value.

3. The method of claim 1, wherein, based on a communication over the third shared channel being an initial transmission of data:

the third MCS index is greater than the second MCS index, and the third MCS index is equal to the reference MCS index plus the first offset value and the second offset value.

4. The method of claim 1, wherein, based on a communication over the third shared channel being a retransmission of data:

the third MCS index is equal to the reference MCS index plus the second offset value.

5. The method of claim 1, wherein the one downlink control information comprises a Sorted Transmission Indicator (STI) for each of the first shared channel, the second shared channel, and the third shared channel.

6. The method of claim 5, wherein a value of the sorted transmission indicator is 1 for shared channels whose MCS indices are sorted in ascending order, and wherein a value of the sort transmission indicator is 0 for shared channels whose MCS indices are not sorted in ascending order.

7. The method of claim 1, wherein the one downlink control information comprises an Unsorted Transmission Indicator (UTI) indicating whether MCS indices applied to the first shared channel, the second shared channel, and the third shared channel are sorted in ascending order.

8. The method of claim 7, wherein, based on there being a shared channel whose MCS indices are not sorted in ascending order from among the first shared channel, the second shared channel, and the third shared channel:

a value of the unsorted transmission indicator is 1, and the one downlink control information comprises a sorted transmission indicator.

9. The method of claim 7, wherein, based on MCS indices applied to the first shared channel, the second shared channel, and the third shared channel are sorted in ascending order:

a value of the unsorted transmission indicator is 0, and the one downlink control information does not comprise a sorted transmission indicator.

10. The method of claim 1, wherein $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information are configured by Radio Resource Control (RRC) from the network, and wherein a sum of total number of bits indicating an offset value from the reference MCS index does not exceed $N_{Total\text{-}Offset\text{-}Bits}$.

11. The method of claim 1, wherein $N_{Type\text{-}1\text{-}Offset\text{-}Bits}$, a number of bits of each offset value of sorted transmissions and $N_{Type\text{-}2\text{-}Offset\text{-}Bits}$, a number of bits of each offset value of unsorted transmissions included in the one downlink control information are dynamically determined by the UE, and wherein a sum of total number of bits indicating an offset value from the reference MCS index does not exceed $N_{Total\text{-}Offset\text{-}Bits}$.

12. The method of claim 1, wherein the first shared channel, the second shared channel, and the third shared channel are downlink shared channels or uplink shared channels or inter-UE shared channels.

13. A User Equipment (UE) comprising:

at least one transceiver;

at least one processor; and at least one memory operably connectable to the at least one processor and storing instructions that, based on being executed by the at least one processor, perform operations comprising:

performing an initial access with a network;

receiving, via the at least one transceiver, one downlink control information from the network over a downlink control channel, wherein the one downlink control information schedules a first shared channel, a second shared channel, and a third shared channel, and wherein the one downlink control information comprises a reference Modulation and Coding Scheme (MCS) index, a first offset value for the reference MCS index, and a second offset value for the reference MCS index;

communicating, via the at least one transceiver, with the network over the first shared channel to which a first MCS index is applied, wherein the first MCS index is based on the reference MCS index; and after communicating with the network over the first shared channel:

i) communicating, via the at least one transceiver, with the network over the second shared channel to which a second MCS index greater than the first MCS index is applied, wherein the second MCS index is based on the reference MCS index and the first offset value; and ii) communicating, via the at least one transceiver, with the network over the third shared channel to which a third MCS index greater than the first MCS index is applied.

14. A base station comprising:

at least one transceiver;

at least one processor; and at least one memory operably connectable to the at least one processor and storing instructions that, based on being executed by the at least one processor, perform operations comprising:

performing an initial access with a User Equipment (UE);

transmitting, via the at least one transceiver, one downlink control information to the UE over a downlink control channel, wherein the one downlink control information schedules a first shared channel, a second shared channel, and a third shared channel, and wherein the one downlink control information comprises a reference Modulation and Coding Scheme (MCS) index, a first offset value for the reference MCS index, and a second offset value for the reference MCS index;

communicating, via the at least one transceiver, with the UE over the first shared channel to which a first MCS index is applied, wherein the first MCS index is based on the reference MCS index; and after communicating with the UE over the first shared channel:

i) communicating, via the at least one transceiver, with the UE over the second shared channel to which a second MCS index greater than the first MCS index is applied, wherein the second MCS index is based on the reference MCS index and the first offset value; and ii) communicating, via the at least one transceiver, with the UE over the third shared channel to which a third MCS index greater than the first MCS index is applied.

* * * * *